(12) United States Patent
Muratani

(10) Patent No.: US 7,082,537 B2
(45) Date of Patent: Jul. 25, 2006

(54) CODE GENERATING METHOD AND UNIT THEREOF, CODE DETECTING METHOD AND UNIT THEREOF, AND WATERMARK EMBEDDING UNIT AND WATERMARK DETECTING UNIT

(75) Inventor: Hirofumi Muratani, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 10/752,665

(22) Filed: Jan. 8, 2004

(65) Prior Publication Data

US 2004/0143742 A1 Jul. 22, 2004

Related U.S. Application Data

(62) Division of application No. 09/658,565, filed on Sep. 8, 2000, now Pat. No. 6,901,515.

(30) Foreign Application Priority Data

Sep. 30, 1999 (JP) ................... 11-280652
Jan. 25, 2000 (JP) ............................ 2000-016285
Aug. 31, 2000 (JP) ............................ 2000-263872

(51) Int. Cl.
*H04L 9/00* (2006.01)

(52) U.S. Cl. ....................................... 713/176
(58) Field of Classification Search ................. 713/176
See application file for complete search history.

(56) References Cited

U.S. PATENT DOCUMENTS

| 5,483,597 | A | * | 1/1996 | Stern | ........................... 380/30 |
| 5,664,018 | A | | 9/1997 | Leighton | |
| 5,915,027 | A | | 6/1999 | Cox et al | |
| 5,949,796 | A | * | 9/1999 | Kumar | ....................... 370/529 |
| 6,005,727 | A | * | 12/1999 | Behrens et al. | ............... 360/48 |
| 6,834,344 | B1 | * | 12/2004 | Aggarwal et al. | .......... 713/176 |

FOREIGN PATENT DOCUMENTS

| JP | 9-191394 | 7/1997 |
| JP | 11-288217 | 10/1999 |
| JP | 2000-3129 | 1/2000 |
| WO | WO 97/34391 | 9/1997 |

OTHER PUBLICATIONS

V.R.L. Shen, et al., IEICE Trans. Fundamentals, vol. E80-A, No. 10 pp. 2035-2037, XP-000767254, "Novel Cryptographic Key Assignment Scheme for Dynamic Access Control in a Hierarchy", Oct. 1, 1997.

(Continued)

*Primary Examiner*—Kambiz Zand
(74) *Attorney, Agent, or Firm*—Oblon, Spivak, McClelland, Maier & Neustadt, P.C.

(57) ABSTRACT

Residue calculating sections respectively obtain residues which take a plurality of integers as modulus, with respect to a user ID. The plurality of integers are stored in modulus storage sections and are prime to each other. Based on these residues and parameters stored in a coding parameter storage section, component codes constructed by continuous sequences of 1 and 0 using a predetermined number of bits as a unit are respectively generated by component code generating sections. These component codes are concatenated by a concatenating section, thereby to obtain a code to be embedded, which constructs watermark information.

3 Claims, 26 Drawing Sheets

OTHER PUBLICATIONS

Jun Yoshida, et al., "A Coding Method for Collusion-Secure Watermark and Less Decline," The 1998 Symposium on Cryptography and Information Security (SCIS '98), 10.2.A, Jan. 28-31, 1998.

Dan Boneh, et al., "Collusion-Secure Fingerprinting for Digital Data," CRYPTO '95, 1995, pp. 452,465.

Masahiro Suzuoki, et al., "A Scheme of Making Collusion-Secure Watermark," The 1997 Symposium on Cryptography and Information Security (SCIS '97), Jan. 29-Feb. 1, 1997, pp. 1-10.

Tetsuya Yamamoto, et al., "A Method of Image Watermarking Which Can Detect All Illegal Users In Collusion," The 1998 Symposim on Cryptography and Information Security (SCIS '98). 10.2 B., Jan. 28-31, 1998, pp. 1-8.

Neal R. Wagner, "Fingerprinting," Proceedings of the 1983 Symposium on Security and Privacy, Apr. 1983, pp. 18-22.

G. R. Blakeley, et al., "Fingerprinting Long Forgiving Messages," CRYPTO '85, pp. 180-189.

Ingemar J. Cox, et al., "Secure Spread Spectrum Watermarking for Multimedia," NEC Research Institute Technical Report 95-10, 1995, pp. 1-33.

Hirofumi Muratani, "Collusion Resilience of Digital Watermarking," The 2000 Symposium on Cryptography and Information Security (SCIS 2000), c06, Jan. 26-28, 2000, pp. 1-8.

Joe Kilian, et al., "Resistance of Digital Watermarks to Collusive Attacks," Department of Computer Science TR-585-98, pp. 1-23.

* cited by examiner

| USER ID | B(0) | B(1) | ... | B($S_{min}$) | ... | B($S_{max}$) | ... | B(n-3) | B(n-2) |
|---|---|---|---|---|---|---|---|---|---|
| 0 | 1···1 | 1···1 | 1···1 | 1···1 | 1···1 | 1···1 | 1···1 | 1···1 | 1···1 |
| 1 | 0···0 | 1···1 | 1···1 | 1···1 | 1···1 | 1···1 | 1···1 | 1···1 | 1···1 |
| ... | | | | | | | | | |
| $S_{min}$ | 0···0 | 0···0 | 0···0 | 1···1 | 1···1 | 1···1 | 1···1 | 1···1 | 1···1 |
| ... | | | | | | | | | |
| $S_{max}$ | 0···0 | 0···0 | 0···0 | 0···0 | 0···0 | 1···1 | 1···1 | 1···1 | 1···1 |
| ... | | | | | | | | | |
| n-2 | 0···0 | 0···0 | 0···0 | 0···0 | 0···0 | 0···0 | 0···0 | 0···0 | 1···1 |
| n-1 | 0···0 | 0···0 | 0···0 | 0···0 | 0···0 | 0···0 | 0···0 | 0···0 | 0···0 |

| ACTUAL COLLUDER ID (c=32+0) | DETECTED COLLUDER(ID) | THE NUMBER OF SATISFIED CONGRUENCES | NON-WEAK ID (1) OR NOT (0) |
|---|---|---|---|
| 3407 | 47824 | 14 | 1 |
| 10640 | 3407 | 12 | 1 |
| 15067 | 30374 | 12 | 1 |
| 27463 | 221988 | 12 | 1 |
| 30374 | 45380 | 11 | 1 |
| 44828 | 44828 | 10 | 1 |
| 45380 | 126166 | 10 | 1 |
| 47824 | 187728 | 10 | 1 |
| 52856 | 2 | 9 | 0 |
| 54546 | 52856 | 9 | 1 |
| 63547 | 63547 | 9 | 1 |
| 75058 | 175612 | 9 | 1 |
| 126166 | 11 | 8 | 0 |
| 133680 | 54546 | 8 | 1 |
| 139843 | 75058 | 8 | 1 |
| 143941 | 133680 | 8 | 1 |
| 163356 | 143941 | 8 | 1 |
| 164408 | 200009 | 8 | 1 |
| 175612 | 202508 | 8 | 1 |
| 187728 | 212493 | 8 | 1 |
| 200009 | 219666 | 8 | 1 |
| 202508 | 262123 | 8 | 1 |
| 204841 | 19 | 7 | 0 |
| 207450 | 223473 | 7 | 1 |
| 210934 | 3 | 6 | 0 |
| 212493 | 4 | 6 | 0 |
| 219666 | 5 | 6 | 0 |
| 221988 | 24 | 6 | 0 |
| 223473 | 38 | 6 | 0 |
| 240733 | 54545 | 6 | 0 |
| 253316 | 139843 | 6 | 1 |
| 262123 | 163356 | 6 | 1 |

FIG. 24

| ACTUAL COLLUDER ID (c=32+32) | DETECTED COLLUDER ID | THE NUMBER OF SATISFIED CONGRUENCES | NON-WEAK ID (1) OR NOT (0) |
|---|---|---|---|
| 2089 | 1 | 13 | 0 |
| 5258 | 4 | 12 | 0 |
| 10732 | 6 | 10 | 0 |
| 13913 | 3 | 9 | 0 |
| 26395 | 7 | 9 | 0 |
| 38321 | 10 | 9 | 0 |
| 43641 | 2 | 8 | 0 |
| 44196 | 11 | 8 | 0 |
| 48052 | 5 | 7 | 0 |
| 54224 | 9 | 7 | 0 |
| 68847 | 14 | 7 | 0 |
| 69827 | 24 | 7 | 0 |
| 70170 | 154324 | 7 | 1 |
| 78476 | 164218 | 7 | 1 |
| 83379 | 221793 | 7 | 1 |
| 83993 | 13 | 6 | 0 |
| 84045 | 17 | 6 | 0 |
| 94102 | 23 | 6 | 0 |
| 96272 | 96272 | 6 | 1 |
| 105743 | 172540 | 6 | 1 |
| 106322 | 16 | 5 | 0 |
| 109875 | 19 | 5 | 0 |
| 117337 | 4128 | 5 | 0 |
| 127964 | 6384 | 5 | 0 |
| 134307 | 59870 | 5 | 0 |
| 134993 | 66825 | 5 | 0 |
| 140009 | 68847 | 5 | 1 |
| 142773 | 76709 | 5 | 0 |
| 149815 | 78476 | 5 | 1 |
| 150357 | 81504 | 5 | 0 |
| 154324 | 83379 | 5 | 1 |
| 156553 | 97042 | 5 | 0 |
| ⋮ | ⋮ | ⋮ | ⋮ |

FIG. 25

CODE GENERATING METHOD AND UNIT THEREOF, CODE DETECTING METHOD AND UNIT THEREOF, AND WATERMARK EMBEDDING UNIT AND WATERMARK DETECTING UNIT

CROSS-REFERENCE TO RELATED APPLICATIONS

This application is a division of U.S. application Ser. No. 09/658,565, Filed Sep. 8, 2000, now U.S. Pat. No. 6,901,515 and is based upon and claims the benefit of priority from Japanese Patent Application No. 11-280,652, filed Sep. 30, 1999; No. 2000-016285, filed Jan. 25, 2000; and No. 2000-263872, filed Aug. 31, 2000, the entire contents of which are incorporated herein by reference.

BACKGROUND OF THE INVENTION

The present invention relates to an electronic watermark unit for embedding watermark information in contents such as audio, music, motion pictures, still images, and the like which are digitized as data, and an electronic watermark detection unit for detecting watermark information from contents having embedded watermark information.

Digital watermarking is a technique as follows. Information such as identification information concerning a copyright holder or user of a content, right information of a copyright holder, conditions for use of a content, secret information required when using a content, copy control information, and/or the like (which are called watermark information) is embedded in contents such as audio, music, motion pictures, still images, and the like which are digitized as data, such that the information cannot be easily discovered. By detecting watermark information later from contents if necessary, use of contents is limited or copyright protection is achieved including copy control. Thus, secondary use is promoted by this technique.

[Requirements for Digital Watermarking]

For the purpose of preventing illegal use, the digital watermarking technique must provide a characteristic (robustness) that watermark information is not eliminated or altered by various operations or intentional attacks that are generally supposed to be made on the digital copyrighted material. For example, still images and motion pictures are often subjected to irreversible compression called JPEG. (Joint Photographic Coding Experts Group) coding and MPEG (Moving Picture Experts Group) coding, respectively. Therefore, it is an important requirement for the digital watermarking technique to have robustness with respect to irreversible compression of these kinds.

[Classification of Digital Watermarks]

Conventional digital watermarking methods for images can be coarsely classified into a pixel area utilization type and a frequency domain utilization type. In a digital watermarking method of the pixel area utilization type, watermark information is directly embedded by changing pixel values. Meanwhile, in a digital watermarking method of the frequency domain utilization type, a pixel area is shifted to a frequency domain by orthogonal conversion, and is then embedded in the frequency domain. Thereafter, the frequency domain is shifted to the pixel area by reverse orthogonal conversion. The watermark information is embedded as a wave.

[Frequency Domain Utilization Type Digital Watermarking Method]

A digital watermarking method of the frequency domain utilization type is described in, for example, reference [1] Cox, I. J., Kilian, J., Leighton, T. and Shamoon, T., "Secure Spread Spectrum Watermarking for Multimedia", NEC Research Institute, Technical Report 95-10, 1995 (hereinafter referred to as Cox et al. method). In this method, a frequency component as a target to be embedded is set within a range from a low frequency to a middle frequency, in which influences from irreversible compression are small. In this manner, the robustness is realized with respect to irreversible compression.

[Digital Watermarking Based on Spread Spectrum]

There is a method of improving the robustness with respect to irreversible compression by adopting the concept of spread spectrum. The spread spectrum means a communication method of transferring information widely spread within a band sufficiently large than a band necessary for a signal to be transmitted by communication (Reference [2]: Yamauchi Yukimichi, "Spread Spectrum Communication", Tokyo-Denki-Daigaku Shuppankyoku, 1994). This method is excellent in tolerance to noise on transfer paths. The concept of spread spectrum is adopted to the digital watermarking technique by considering an original content as a carrier wave, watermark information as a desirable wave, and influence from irreversible compression as a interference wave (noise). Spread within a frequency domain (see the reference [1]) has been proposed as a digital watermarking method based on spread spectrum.

[Spread in Frequency Domain (Perturbation Method)]

In the method according to the reference [1] described above, watermark information is embedded by performing orthogonal conversion on pixel values, and watermark information is spread and embedded in a frequency domain. Spreading is carried out by changing a plurality of frequency components in the frequency domain, in accordance with a random number sequence. After the spreading, reverse orthogonal conversion is carried out. To detect watermark information, orthogonal conversion is performed on pixel values, and a determination is made on correlative values between values of the frequency components where watermark information is embedded and the random number sequence used for embedding the watermark information. Embedded watermark information is spread throughout the entire image (block) within the pixel area, so the watermark information is robust with respect to various operations. If the frequency components where watermark information is embedded is within a low/middle frequency domain, the watermark information is difficult to eliminate by a low-frequency pass filter.

[Fingerprinting]

In the digital watermarking method, consideration has been taken into an application that a user ID (user identification number) is embedded as watermark information in contents so that information specifying a user of the content is embedded. This application is called "fingerprinting" and is expected to restrict redistribution of illegal copies, e.g., pirated editions.

[Problem of Collusion Attack]

However, when there are a plurality of equal contents which respectively have different embedded watermark information items, there can be an act of using the plurality of contents to alter or eliminate the watermark information items. This act is called "collusion attack". For example, in the collusion attack, the pixel values are averaged between the plurality of contents to forge a new content, or a part where pixel values or frequency component values differ between the plurality of contents is altered by changing the values at random or in accordance with majority/minority rule. [Conventional Countermeasures Against Collusion Attack]

As conventional methods for dealing with a collusion attack, there have been proposal for methods based on spread spectrum (the above-mentioned reference [1] and a reference [3]: Tetsuya Yamamoto, Sou Watanabe, and Tadao Kasa, "Digital Watermarking Method Capable of Determining All Collusion Attack Users-", SCIS'98, 10.2.B, 1998), and code-logical methods (a reference [4]: Boneh, Dan and Shaw, James, "Collusion-Secure Fingerprinting for Digital Data", CRYPTO'95, 452–465, 1955., a reference [5]: Masahiro Suzuoki, Sou-Watanabe, Tadao Kasa, "Digital Watermarking Method Robust to Collusion Attack", SCIS'97, 31B, 1997, and a reference [6]: Jun Yosida, Keiichi Iwamura, and Hideki Imai, "Digital Watermarking Method with Less Image Quality Deterioration and Robust to Collusion Attack", SCIS'98, 10.2.A, 1998).

According to the reference [1], a different actual random number sequence according to N(0, 1) is given for every user. It is supposed that no correlation exists between two different actual random number sequences. A collusion attack is taken as an operation which averages pixel values. The correlation value at the time of detection attenuates due to collusion attack.

In the reference [1], a colluder is detected by a defined similarity in place of the correlation value. The similarity is defined as a result of dividing a correlation value by the norm of detected watermark information. Since the norm of watermark information attenuates due to the collusion attack, the similarity does not much attenuates even if the correlation value attenuates. In this manner, all the colluders can be determined. However, this method has a difficulty that it requires an original image as an embedding target and takes a long time to determine colluders.

The reference [3] proposes a method of determining a colluder, which contrastingly uses the characteristic of attenuation of the correlation value due to averaging when a collusion attack occurs. Since a watermark which is common to colluders does not attenuate while other watermarks attenuate, a set of colluders is determined from a set of watermarks which maintains the level at the time of embedding through the collusion attack. Where n is the number of all users and c is a supposed maximum number of colluders, colluders can be determined by an embedded code having a length of $(c+1)(c-1)\log_{c+1} n$ order. However, this method utilizes a characteristic particular to the spread spectrum method, and therefore cannot be applied to all digital watermarking methods.

The above-mentioned reference [4] proposes a method which utilizes a characteristic that a bit having a value common to all colluders cannot be observed in codes expressing watermark information by colluders. If such an unobservable bit remains unchanged, a code (called a c-frameproof code), which cannot generate a codeword of other users than colluders no matter how the other bits may be changed, is generated as an embedded codeword and is embedded as watermark information in a content.

In this method, there is a possibility that a codeword which does not belong to any person is generated as an embedded codeword. However, if a user redistributes a user's own content (native redistribution), he cannot make a denial saying that the redistribution is based on a collusion attack from another person.

The n-frameproof code which receives no limitation to the total number of colluders has a code length of n. The c-frameproof code in which the total number of colluders is c at most has a code length of $16c^2 \log n$ (where c is the number of colluders and n is the number of all users).

Further, the reference [4] shows the following. That is, there exist no code (totally c-secure code) in which, if there are two groups of colluders and a common part of them is a null set, a common part common to sets of codewords (feasible sets) which can be generated by a collusion attack in each group is also a null set. That is, the reference shows that there strictly is no code that strictly cannot generate a codeword which does not belong any colluder by a collusion attack.

Hence, in the reference [4], a code (c-secure code with $\epsilon$-error) having a probability of $\epsilon$ or less at which an incorrect colluder (an innocent user) is erroneously pointed out in case where the number of colluders is c or less is constructed as an embedded code. At first, a n-secure code $\Gamma(n, 2n^2 \log(2n/\epsilon))$ with $\epsilon$-error is constructed. The code length thereof is $2n^2(n-1)\log(2n/\epsilon)$.

Further, by combining the above code with an idea used in the Traitor Tracing scheme (reference [7]: Chor, B., Fiat, A. and Naor, M., "Tracing traitors", Proceedings of CRYPTO'94, 257–270, 1994), a c-secure code with $\epsilon$-error is constructed. This code has a code length of $O(c^4 \log(n/\epsilon)\log(1/\epsilon))$.

[Chernoff Bound]

In the reference [7], the number of keys particular to users, which is necessary to determine a colluder by using a formula of the Chernoff bound, is determined by the Traitor Tracing scheme. In the reference [4] described previously, this method is appropriately used to construct an n-secure code and a c-secure code with $\epsilon$-error. When there are independent n probability variables $X_i \in \{0,1\}$ whose average value is p, the Chernoff bound gives bounds on the probability at which the sum of the variables is offset from the average value. The upper and lower bounds are obtained by the following formulas, respectively.

$$\Pr\left[\sum_{i=1}^{n} X_i - np > n\delta\right] < \{\exp(\delta/p)/(1+\delta/p)^{1+\delta/p}\}^{np}$$

$$\Pr\left[\sum_{i=1}^{n} X_i - np < -n\delta\right] < \{\exp(-\delta/p)/(1-\delta/p)^{1-\delta/p}\}^{np}$$

Further, the next formula exists as a loose bound.

$$\Pr\left[\left|\sum_{i=1}^{n} X_i - np\right| > n\delta\right] < 2 \cdot \exp\{-\delta^2 n/(2p(1-p))\}$$

Where $0 \leq \delta < p(1-p)$ exists, the next formula is given then.

$$\Pr\left[\sum_{i=1}^{n} X_i - np < -n\delta\right] < \exp\{-\delta^2 n/(2p^2)\}$$

[Method for Pointing Out only Two of Colluders]

The n-secure code and c-secure code with $\epsilon$-error proposed in the reference [4] are designed so as to point out as many colluders as possible. Considering the users as an ordered set, the $\Gamma_0(n,d)$ code can be used as a code which specifies two of the uppermost and lowermost in a set of colluders. In this case, the $\Gamma_0(n,d)$ code can be constructed with a much smaller code length.

The $\Gamma_0(n,d)$ code is a code which is constructed by continuous sequences of 1 and 0, taking d bits as a unit. The d-bit sequences of 1 and 0 are disposed such that the number of units is equal to the number of codewords n minus 1. Accordingly, in this code, 1 and 0 are disposed continuously, taking d bits as a unit for each. A sequence of 1 or 0 smaller than d-bits does not exist isolatedly.

For example, let d=3 and n=5, $\Gamma_0(5,3)$ code becomes as follows.

| 111 | 111 | 111 | 111 |
|-----|-----|-----|-----|
| 000 | 111 | 111 | 111 |
| 000 | 000 | 111 | 111 |
| 000 | 000 | 000 | 111 |
| 000 | 000 | 000 | 000 |

The reference [5] proposes an n-secure code in which two codes layered in the ascending order and descending order are used to specify two in a set of colluders. The code length of this code is $2n \log_4(2/\epsilon) = n \log_2(2/\epsilon)$. The reference [6] shows a similar method as follows. That is, the minimum S(Smin) which satisfies 0<weight($x|_{Bs}$) and the maximum S(Smax) which satisfies weight($x|_{Bs}$)<d are obtained by the $\Gamma_0(n,d)$ code. Two of colluders are specified by an algorithm which points out that Smin and Smax+1 are colluders. In case of this code, the n-secure code with $\epsilon$-error has a code length of $(n-1)\log_2(2/\epsilon)$.

[2-secure Code with $\epsilon$-Error]

If the total number of colluders is small, the code length of the embedded code can be small. The reference [6] described above shows a code which points out both of colluders where the total colluders is two and which has a code length of $(3n^{1/2}-1) \log_2(6/\epsilon)$.

[Limit of Collusion-Resistance]

A reference [9] (Ergun, Funde, Joe Kilian and Ravi Kumar, "A Note on the Limits of Collusion Resistant Watermarking", EUROCRYPT'99, 140–149, 1999) theoretically shows that a limit of resistance to collusion attacks exists without depending on details of digital watermarking methods. Their conclusion says that a try to raise the probability of pointing out correct colluders leads to an increase of the probability (false positive rate) of incorrectly pointing out innocent users mistaken as colluders.

A collusion attack supposed in the reference [9] is that a plurality of contents (e.g., contents 1, 2, and 3) in which different watermark information items are respectively embedded are averaged as shown in FIG. 1 and a random disturbance is added thereafter. From the viewpoint of Ergun et al., the discussion previously made in the reference [4] will now be reconsidered. In the discussion in the reference [4], the $\Gamma_0(n,d)$ code is used as an element of the stochastic c-secure code. This $\Gamma_0(n,d)$ code is obtained by directly multiplying coding, which takes codewords at (1,1,1) and (-1,-1,-1) as shown in FIG. 2 (d=3), by n times.

If the collusion attack supposed in the reference [9] is applied to this $\Gamma_0(n,d)$ code, a barycenter of the averaged content obtained resides on a line connecting (1,1,1) with (-1,-1,-1). In this case, if the content after the collusion attack is near (1,1,1) or (-1,-1,-1), it is determined that the content has not been changed by a collusion attack. Otherwise, if the content after the collusion attack is near the origin, it is determined that the content has been changed by a collusion attack.

At this $\Gamma_0(n,d)$ code, if there is a large bias between the number of persons having the code of (1,1,1) among colluders and the number of persons having the code of (-1,-1,-1), the barycenter is positioned to be very close to (1,1,1) or (-1,-1,-1) as a result of averaging. Since a random disturbance is given thereafter, the algorithm which specifies colluders may determine erroneously whether the content has been shifted from (1,1,1) or (-1,-1,-1) by the disturbance or from the barycenter by a disturbance with in negligible probability. That is, as Ergun et al. say that their conclusion is applicable to almost all digital watermark algorithms, the coding of Boneh et al. cannot avoid the limit of Ergun et al.

Meanwhile, as for the $\Gamma_0(n,d)$ code, the maximum distance between two codewords is nd, and the minimum distance therebetween is as wide as d (see FIG. 3). This is because codewords are provided sparsely in a space of receiving signals since the $\Gamma_0(n,d)$ code is designed with importance on the resistance to collusion attacks.

A digital watermarking algorithm must embed a codeword having a maximum distance nd between codewords so that the quality of contents might not be influenced. If a digital watermarking algorithm embeds a codeword of the $\Gamma_0(n,d)$ code in a content space and this embedding has a characteristic that the distance between codewords is approximately proportional to the distance between contents which the codewords are embedded in, the maximum distance between an original content and a content after embedding watermark information is nd/2 or more. Therefore, if nd is large, influences to the quality of contents are large (the embedding 1 in FIG. 4).

If the digital watermarking algorithm sets all codewords situated at a substantially equal distance from the original content by such embedding that does not maintain a relationship between embedded content and the original content in the content space, the grounds for the resistance to collusion attacks, which the $\Gamma_0(n,d)$ code originally has, are lost (embedding 2 in FIG. 4).

That is, with the limit of Ergun et al. in mind, it is desired to realize a digital watermarking method by coding which properly realizes both of high resistance to collusion attacks and low influence on the quality of contents.

(Watermark Resistance to Collusion Attacks by Spread Spectrum)

Meanwhile, in the digital watermarking method based on spread spectrum, the embedding strength is set so that embedding might not make large influences on the quality of contents. Based thereon, pseudo-random number sequences used for embedding correspond to codewords.

Orthogonal tranformation between the sample value space and the frequency space is linear mapping. Therefore, the collusion attack of Ergun et al. operates to average the pseudo random number sequences and further to give a disturbance, regardless of whether the digital watermarking method to be attacked is based on a space domain or a frequency domain.

In the digital watermarking method based on spread spectrum, the pseudo random number sequences as codewords are normally selected such that the cross-correlations are substantially zero. Therefore, with respect to a content obtained by averaging k contents, it is considered that the correlation corresponding to a colluder attenuates to 1/k. If the cross-correlation between pseudo random number sequences is sufficiently small and if k is not much large, the correlation value can exceed a predetermined threshold value in detection of a digital watermark, so colluders can be detected.

The method according to the reference [1] is based on a prerequisite of using an original content in detection, and detection is carried out with use of an amount called a similarity, in place of a correlation value. The similarity is obtained by normalizing a cross-correlation value between a difference obtained by subtracting an original content from a detection-target content and a pseudo random number sequence used for embedding, by a square root of a self-correlation value of the difference.

In the detection using the similarity, the correlation value of a numerator attenuates to 1/k by averaging in a collusion attack, while the norm of a difference of a denominator also attenuates to 1/k. Therefore, the similarity is expected not to attenuate. However, if other noise is added than the averaging, the influence from the noise is rather enlarged by the normalization.

In a reference [10] (Kilian, Joe, F. Thomas Leighton, Lesley R. Matheson, Talal G. Shamoon, Robert E. Tarjan, and Francis Zane, "Resistance of Digital Watermarks to Collusive Attacks", Technical Report TR-585-98, Department of Computer Science, Princeton University, 1998), a theoretical consideration is made by statistical discussions on a subject that the digital watermarking method according to the reference [1] can prove resistance to collusion attacks of how many colluders. The pseudo random number sequence is supposed to be a Gaussian noise, and it is supposed that a collusion attack is achieved by statistically estimating an original content from contents which colluders own. As a result of this, it is concluded that resistance to collusion attacks from about several to over-ten colluders can be realized by realistic parameter setting.

Depending on the types of applications of digital watermarks, there is a case that detection using an original content cannot be carried out and a detection must be made from only the content as a detection target. In this case, the detection based on the similarity cannot be made. In this case, it is considered that tolerable number of colluders is much smaller.

All the discussions in the references [1] and [10] are based on a prerequisite that the cross-correlation between pseudo random number sequences as codewords is sufficiently small. However, it is considered that, as the number of pseudo random number sequences increases, the possibility at which a pair having a large cross-correlation value accidentally appears increases in general, even if they are selected at random.

However, there remains an unsolved problem in how many pseudo random number sequences can reduce the cross-correlation value between an arbitrary pair, how pseudo random number sequences having such a characteristic can be selected, and what a digital watermarking method should be realized to achieve a method resistant to collusion attacks, by using the selected pseudo random number sequences as codewords.

This problem is considered as one of problems in how a digital watermarking method based on coding which properly realizes both of high resistance to collusion attacks and low influence on the quality of contents can be realized, after being conscious about the limits according to the reference [9] described previously in the article concerning the resistance to collusion attacks.

A method of using a M-sequence is known as a method for generating binary pseudo random bit sequences which have a small cross-correlation. The M-sequence is generated as an output of a linear feedback shift register (LFSR), if the LFSR has a tap corresponding to a coefficient of a primitive polynomial of an extension field of GF(2). If 1 and 0 in the M-sequence are respectively replaced with +1 and −1, a PN-sequence is obtained. In the M-sequence, the appearance frequency of 0 is substantially equal to that of 1 (although the number of appearances of 1 is smaller by one than that of 0 in a period), and the cross-correlation function has a value of 1 at 0 and has a value of −1/L otherwise. $L=2^n-1$ is given where L is a period of the sequence and n is the number of stages of the register.

If sequencies obtained by cyclic-shifting a PN-sequence obtained from a M-sequence are adopted as codewords, codewords having a small cross-correlation are obtained. These codewords may be used as pseudo random number sequences when embedding a digital watermark. This random number sequences can be used for digital watermarks based on spread spectrum of both in the space domain and the frequency domain.

In the digital watermarking method based on spread spectrum of the frequency domain, a Gaussian noise according to N(0,1) is used as a codeword. To construct a plurality of codewords which have a small cross-correlation, the following method is adopted. That is, random number sequences are generated one after another, and a check that each of them has a small correlation with all random sequences that have been generated before is made. If any of them has a large cross-correlation value, the random number sequence is not adopted as a codeword.

However, in this method, it is not guaranteed that a newly generated random number sequence has small cross-correlation with a random number sequence which has been generated before. Therefore, a newly generated random number sequence may be abandoned in some cases, so the processing is wasteful. In particular, if the number of random number sequences increases to some extent, the probability increases.

As has been explained above, in conventional digital watermarking techniques, there is a risk that illegal users cannot be specified even when illegal redistribution is carried out by eliminating or forging watermark information by collusion attacks.

Also, in conventional proposals for realizing robustness to collusion attacks, it is necessary to embed watermark information by a very redundant manner. Therefore, there is a drawback that a very large total number of users or colluders cannot be assumed. Even if a large total number of users or colluders can be assumed, deterioration of the quality of contents may be induced by embedding a codeword having a large code length, as watermark information.

Further, watermark information (or an embedded codeword) must be constructed after correctly estimating a detection error when determining or specifying a colluder. In this respect, however, the conventional digital watermarking techniques do not have enough consideration on their validity. In particular, the conventional techniques do not provide sufficiently by practical countermeasures against the case where three or more colluders participate in an alteration. Also, the code length of an embedded codeword as watermark information may be unnecessarily large for the expected detection error.

BRIEF SUMMARY OF THE INVENTION

An object of the present invention is to provide a watermark embedding unit and a watermark detecting unit which are resistant to collusion attacks and are capable of embedding watermark information while restricting deterioration of the quality of contents as much as possible even if the total number of users or colluders is large.

Another object of the present invention is to provide a watermark embedding unit which is resistant to collusion attacks and are capable of generating a sufficient and proper codeword to be embedded, based on correct estimation of an error rate, even if three or more colluders participate in an alteration, and a watermark detecting unit which is capable of properly detecting and decoding the embedded codeword.

To achieve the above objects, a first code generating unit according to the present invention: residue calculating means for calculating a plurality of residues, taking a plurality of integers which are prime to each other, as moduli, with respect to a user identification number of a user who uses the content; component code generating means for generating a plurality of codewords of component codes respectively expressing the residues obtained by the residue calculating means, each of the codeword of the component codeword being a codeword expressing a code obtained by the residue calculating means and being constructed by continuous sequences of 1 and 0 using a predetermined number of bits as a unit; and concatenating means for concatenating the codewords of the component codes generated by the component code generating means, thereby to generate the codeword to be embedded.

A first code detecting unit according to the present invention, corresponding to the first code embedding unit, comprises: code dividing means for dividing an embedded codeword which concatenates a plurality of codewords of component codes constructed by continuous sequences of 1 and 0 using a predetermined number of nits as a unit, into codewords of the component codes; component code decoding means for decoding each of the codewords of the component codes divided, thereby to obtain a plurality of residues pairs each comprising two residues, taking a plurality of integers which are predetermined and are prime to each other, as modulus; and colluder number calculating means for calculating a user identification number of a colluder who made a collusion attack on the content, from the plurality of residue pairs.

Also, this unit further comprises collusion determining means for determining presence or absence of a collusion from the plurality of residue pairs, wherein the colluder identification number calculating means may calculate the user identification number of the colluder, if presence of a collusion is determined by the colluder determining means.

The colluder number calculating means includes: a residue selecting section for selecting one residue from each of k' inputted residues pairs, thereby to generate a set of k' residues $(R_1, R_2, \ldots, R_{k'})$; a Chinese remainder theorem section for calculating a candidate of a user identification number u of a colluder, from k residues $(S_1, S_2, \ldots, S_k)$ which are selected from the set of k' residues generated by the residue selecting section, and a consistency checking section for selecting the k residues from the set of k' residues generated by the residue selecting section, for supplying the k residues to the Chinese remainder theorem section, for specifying a user identification number of the colluder from the candidate of the user identification number u of the colluder calculated by the Chinese remainder theorem section, and for outputting the user identification number of the colluder, wherein the consistency checking section has selection processing for selecting the k residues from the set of k' residues generated by the residue selecting section, determination processing for determining whether or not a relationship of $R_i = u \mod p_i$ ($i = i_1, i_2, \ldots, i_l$) exists between the candidate of the user identification number u of the colluder calculated by the Chinese remainder theorem section and a predetermined number (l) of residues among remaining (k'-k) residues, and output processing for outputting the candidate as a user identification number of a colluder if the relationship exists as a result of the determination processing, if the relationship does not exist, a new combination of k residues $(S_1, S_2, \ldots, S_k)$ is selected from the set of the k' residues generated by the residue selecting section, thereby to carry out the determination processing, and if the relationship does not exist with respect to any of all combinations of k residues $(S_1, S_2, \ldots, S_k)$, a new set of k' residues is requested to the residue selecting section, and the selection processing and the determination processing are repeated until the relationship exists.

A second code generating unit according to the present invention comprises: calculating means for calculating a set of a plurality of integral elements in correspondence with an inputted user identification number; component code generating means for generating codewords of component codes respectively in correspondence with the integral factors, such that among k' component codes capable of expressing all sets of integral elements that are calculated by the calculating means with respect to a predetermined number of user identification numbers, k combinations of the k' codewords of component codes can uniquely express the user identification numbers; and concatenating means for concatenating the codewords of the component codes generated by the component code generating means, thereby to generate codewords to be embedded, wherein k' is determined to be c(k+l)/q or more where c is a positive integer of 3 or more, l is a positive integer of 1 or more, and q is a number of the integral elements which can be detected from each of the component codes when detecting the embedded codeword. More preferably, where $p_i$ (i=1, 2, ..., k') is the number of values which each of the integral elements calculated by the calculating means can take with respect to the predetermined number of user identification numbers and where $\epsilon$ is a detection error rate which is assumed when detecting the codeword to be embedded, k' is determined such that a condition of $$\left[1 - \prod_{i=1}^{l}\left\{1 - \left(1 - \frac{1}{p_i}\right)^c\right\}\right]^{c(k+l)/2 C_{k+l} \times 2^{k+l}} \geq 1 - \frac{\varepsilon}{2} \tag{1}$$

is satisfied.

The calculating means calculates a set of integral elements, which is the set of residues with the relatively prime $p_i$ (I=1, 2, ..., k') as moduli, in correspondence with the inputted user identification number, or a set of numbers of elements, which belong to an equivalence class defined by a parallel transformation, as the set of integral elements, in correspondence with the inputted user identification number, and where $p_i$ (i=1, 2, ..., k') is one same positive integer p. In the later case, a condition of $$k' = \frac{c}{2}(k+l) \le \frac{p^k - 1}{p - 1} \quad (2)$$

is further satisfied.

A second code detecting unit according to the present invention, corresponding to the second code generating unit, comprises: codeword extracting means for extracting an embedded code from a target in which the embedded codeword is embedded, the embedded codeword concatenating codewords of component codes respectively generated in correspondence with an inputted user identification number and also being such that among k' component codes capable of expressing all sets of integral elements that are calculated with respect to a predetermined number of user identification numbers, k combinations of the k' component codes can uniquely express the user identification numbers; code dividing means for making a division into extracted component codes; component code decoding means for decoding each of the component codes divided; and colluder number calculating means for calculating a user identification number of a colluder from a decoding result of each of the component codes, wherein k' is determined to be c(k+l)/q or more where c is a positive integer of 3 or more, l is a positive integer, and q is a number of the integral elements which can be detected from each of the component codes when detecting the embedded code.

The set of integral elements is a set of residues, which are calculated in correspondence with the user identification number and take a plurality of integers relatively prime to each other as modulus, or a set of numbers of elements which are calculated in correspondence with the user identification number and belong to an equivalence class defined by a parallel transformation. In the latter case, the condition of (2) is further satisfied in addition to the condition of (1), where $p_i$ (i=1, 2, . . . , k') is one same positive integer p.

A third code detecting unit according to the present invention comprises: code extracting means for extracting an embedded codeword from a target in which the embedded codeword is embedded, the embedded codeword concatenating the codewords of component codes respectively generated in correspondence with an inputted user identification number and also being such that among k' component codes capable of expressing all sets of integral elements that are calculated with respect to user identification numbers, k combinations of the k' component codes can uniquely express the user identification numbers; code dividing means for dividing the extracted codeword into codewords of the component codes; component code decoding means for decoding each of the component codes divided; and colluder number calculating means for calculating a user identification number of a colluder from a decoding result of each of the component codes, wherein the component code decoding means includes a block dividing section for dividing each of the component codes into blocks, a counting section for counting a number of bits of "1" in every one of the blocks, a first determining section for determining whether or not a count value obtained by the counting section exceeds a first threshold value, a second determining section for determining whether or not the count value is smaller than a second threshold value, a minimum position selecting section for selecting a minimum block determined as exceeding the first threshold value by the first determining section, and a maximum position selecting section for selecting a maximum block selected as being smaller than the second threshold value, thereby to output a selection results of the minimum and maximum position selecting sections, as a decoding result.

Further, according to the present invention, there is provided a watermark embedding unit for embedding a codeword generated by the first or second code generating unit, as watermark information, into an embedding target content.

Another watermark embedding unit according to the present invention is a watermark embedding unit for embedding watermark information containing information of a user identification number into a content as an embedding target, and comprises: means for outputting one codeword selected from a plurality of codewords composing a simplex code, in correspondence with an inputted user identification number; and means for embedding the outputted codeword as the watermark information into the content as an embedding target.

Another watermark detecting unit according to the present invention is a watermark detecting unit for detecting watermark information containing information of a user identification number from an inputted content, and comprises: means for outputting one codeword selected from a plurality of codewords composing a simplex code, in correspondence with an inputted user identification number; means for obtaining a correlation value between the outputted codeword and the content; and means for determining presence or absence of a codeword corresponding to the inputted user identification number in the content, based on the correlation value.

In the code generating unit, code decoding unit, watermark embedding unit, and watermark detecting unit according to the present invention as described above, it is possible to attain robustness to collusion attacks without increasing the code length of the embedded code as watermark information so much, even if the total number of users and colluders is large.

Also, by satisfying the condition of $k' \ge c(k+l)/q$ and the conditions (1) and (2), it is possible to realize a code generating unit capable of generating a sufficient and proper code to be embedded, based on correct evaluation of an error rate when detecting a code to be embedded, and a code decoding unit capable of generating the embedded coded, even if three or more colluders participate in an alteration.

As explained above, according to the present invention, it is possible to maintain robustness to collusion attacks without deteriorating the quality of contents by embedding watermark information having a small code length, even if the total number of users and colluders is large, in the watermark embedding unit and the watermark detecting unit forming part of a fingerprinting system. Also, it is possible to attain robustness to other attacks such as irreversible compression and the like.

Also, if different device control information items are embedded in one same content when watermark information such as copy control information, a playback control information or use control information is embedded to control devices using contents by means the watermark embedding unit and the watermark detecting unit according to the present invention, it is possible to construct a content utilization system having robustness to attacks which will alter the control information, by comparing the control information items.

Further, according to the present invention it is possible to provide a code generating unit which has resistance to collusion attacks and can generate a sufficient and proper code to be embedded, based on correct evaluation of an error rate, and a code detecting unit which can correctly decode the embedded code, even if three or more colluders participate in an alteration.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 24 shows the correspondence relationship between the colluder ID detected with respect to an actual colluder ID, the number (x) of satisfied congruencies, and non-weak ID (1) or not (0) where the number of colluders is 32;

FIG. 25 shows the correspondence relationship between the colluder ID detected with respect to an actual colluder ID, the number (x) of satisfied congruencies, and non-weak ID (1) or not (0) where the number of colluders is 64;

DETAILED DESCRIPTION OF THE INVENTION

Figure 1:
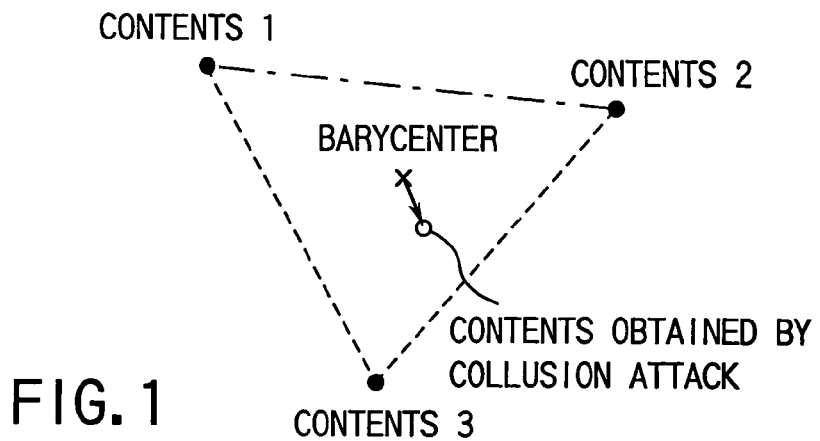
FIG. 1 is a view explaining a collusion attack to a watermark.
Figure 2:
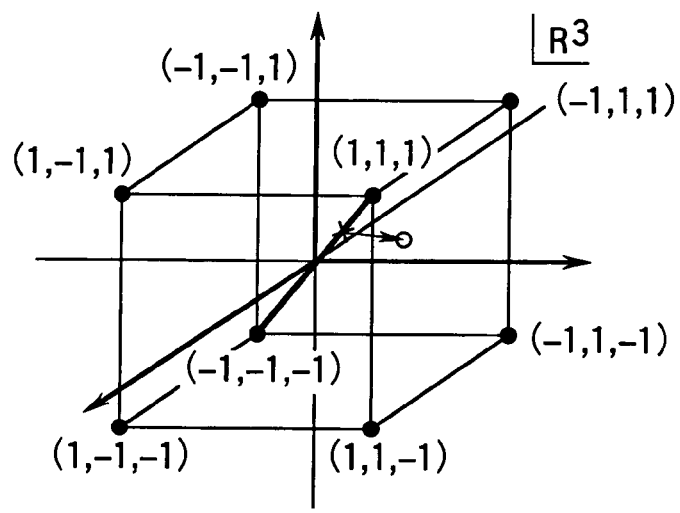
FIG. 2 is a view explaining a $\Gamma_0(n,d)$ code and a collusion attack thereto.
Figure 3:
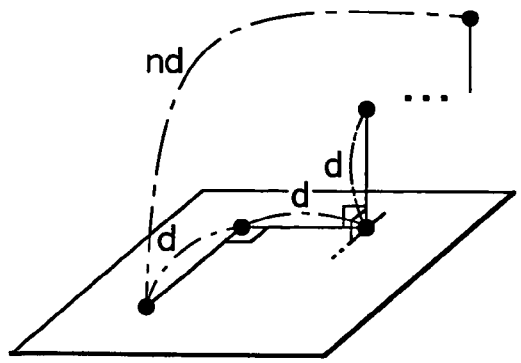
FIG. 3 is a view explaining the maximum and minimum distances between two codes of the $\Gamma_0(n,d)$ code.
Figure 4:
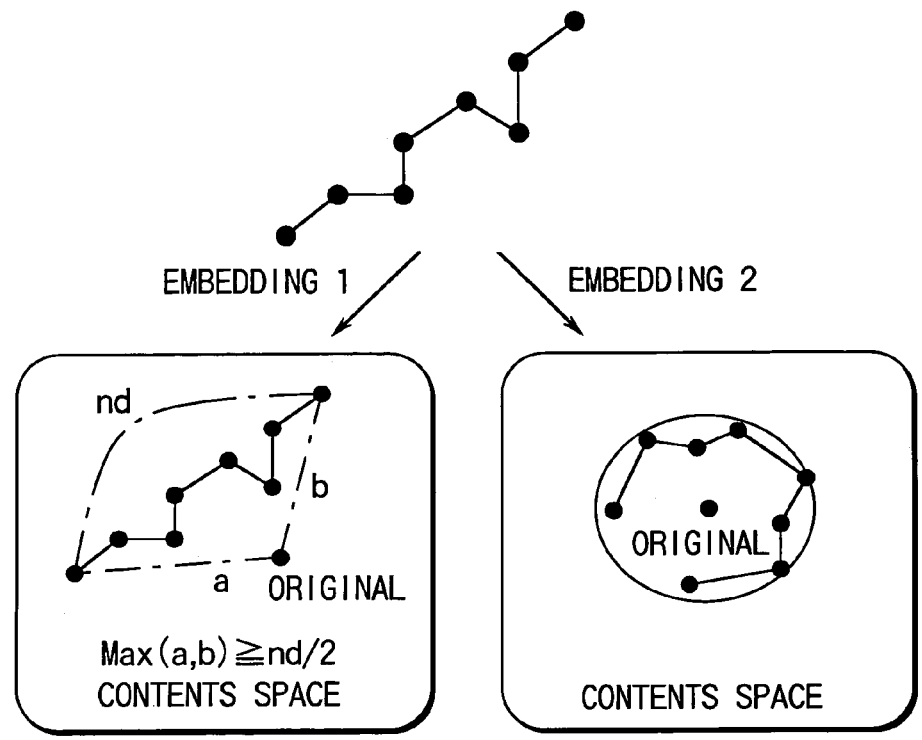
FIG. 4 is a view explaining a problem in a conventional digital watermark algorithm using the $\Gamma_0(n,d)$.
Figure 5:
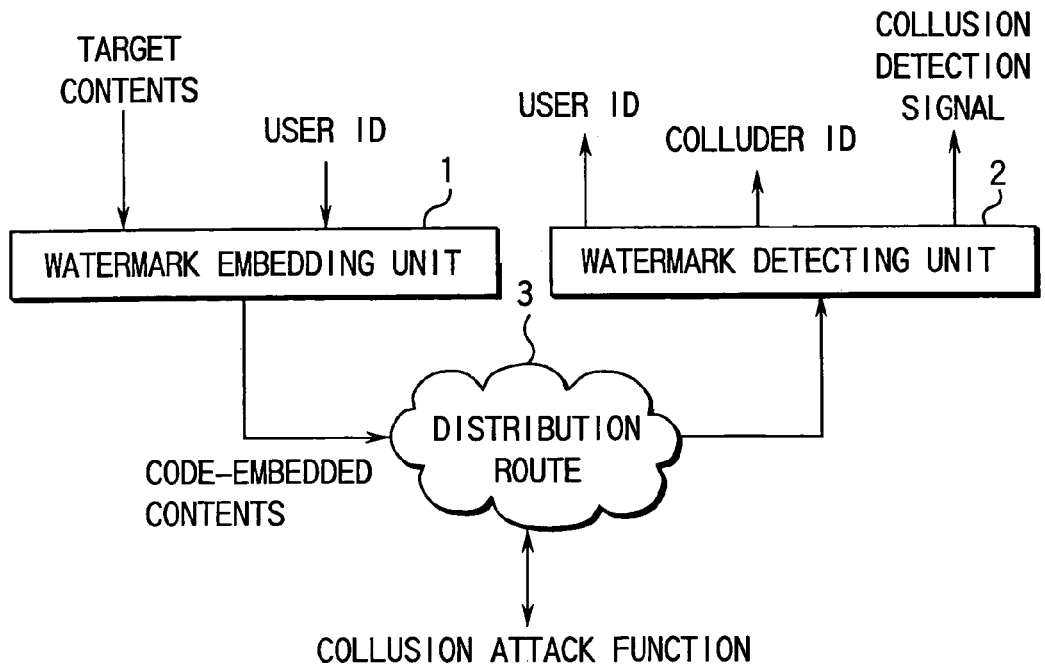
FIG. 5 is a view showing a schematic structure of a fingerprinting system to which the watermark embedding unit and the watermark detecting unit according to the present invention are applied.

FIG. 5 is a conceptual view showing a finger-printing system as an example of a system to which a watermark embedding unit 1 and a watermark detecting unit 2 according to the present invention.

A content such as an image, movie or audio, as a target content, and a user identification number (which will be hereinafter called a user ID) are inputted to the watermark embedding unit 1 and the code-embedded content thereby obtained is distributed through a distribution route 3, which may include a storage medium which stores the content and may be a communication network.

A collusion attack as described previously is made on the code-embedded content on the distribution route 3. To resist this kind of collusion attack, the watermark detecting unit 2 based on the present invention generates a collusion attack determination signal indicating presence or absence of a collusion attack, a colluder ID (a user ID of the colluder), and a proper user ID in case where no collusion attack is made.

In the following, explanation will be made of embodiments of the watermark embedding unit and the watermark detecting unit.

FIRST EMBODIMENT

A watermark embedding unit and a watermark detecting unit in which a c-secure code with ε-error having a smaller code length than a conventional example is used as an embedded code will be explained as a first embodiment of the present invention.

Figure 6A:
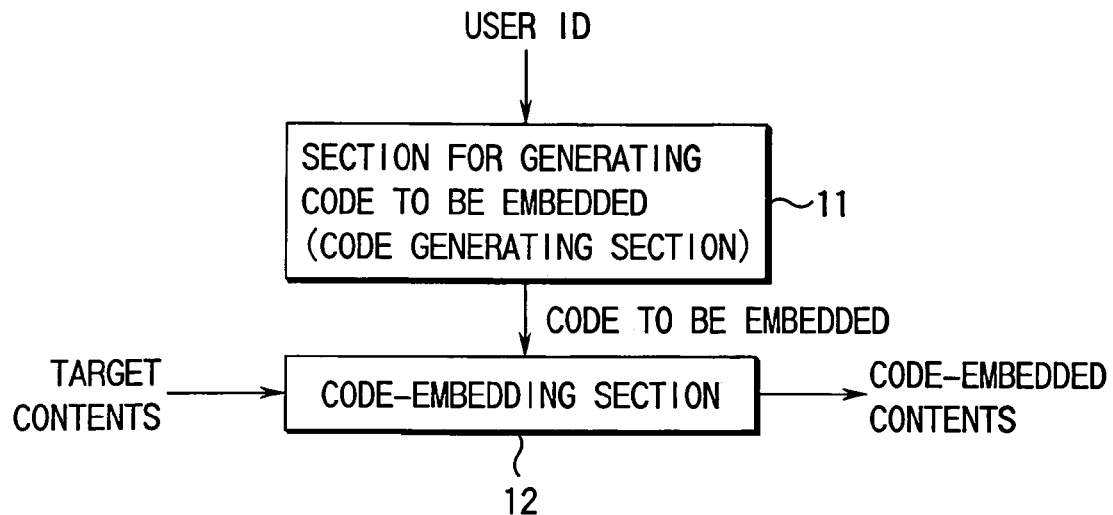
FIGS. 6A and 6B are block diagrams showing structures of the watermark embedding unit and the watermark detecting unit according to the first embodiment of the present invention.
Figure 6B:
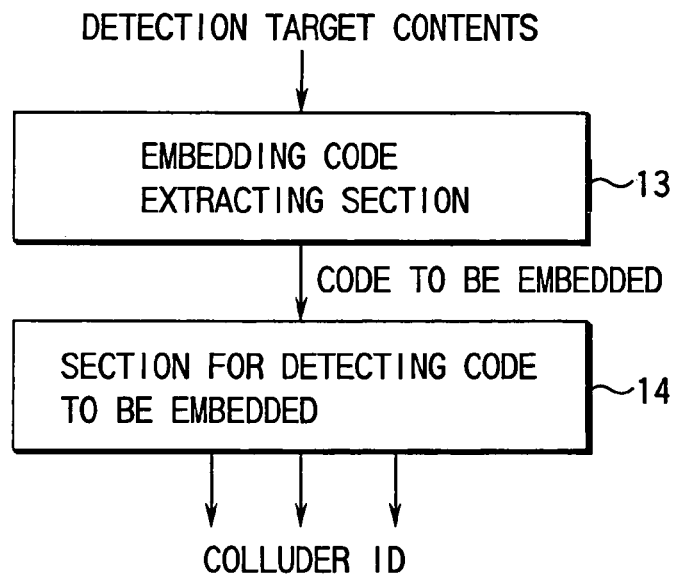

FIGS. 6A and 6B show schematic structures of the watermark embedding unit and watermark detecting unit according to the first embodiment of the present invention. The watermark embedding unit shown in FIG. 6A is comprised of a code generating section 11 for generating a code of a user ID to be embedded, which is watermark information to be embedded, and a code embedding section 12 for embedding the generated code into a target content, thereby to obtain a code-embedded content. Meanwhile the watermark detecting unit shown in FIG. 6B is comprised of an embedded-code extracting section 13 for extracting an embedded code from a target content (e.g., a code-embedded content), and an embedded code detecting section 14 for detecting and decoding the extracted embedded code.

Figure 7:
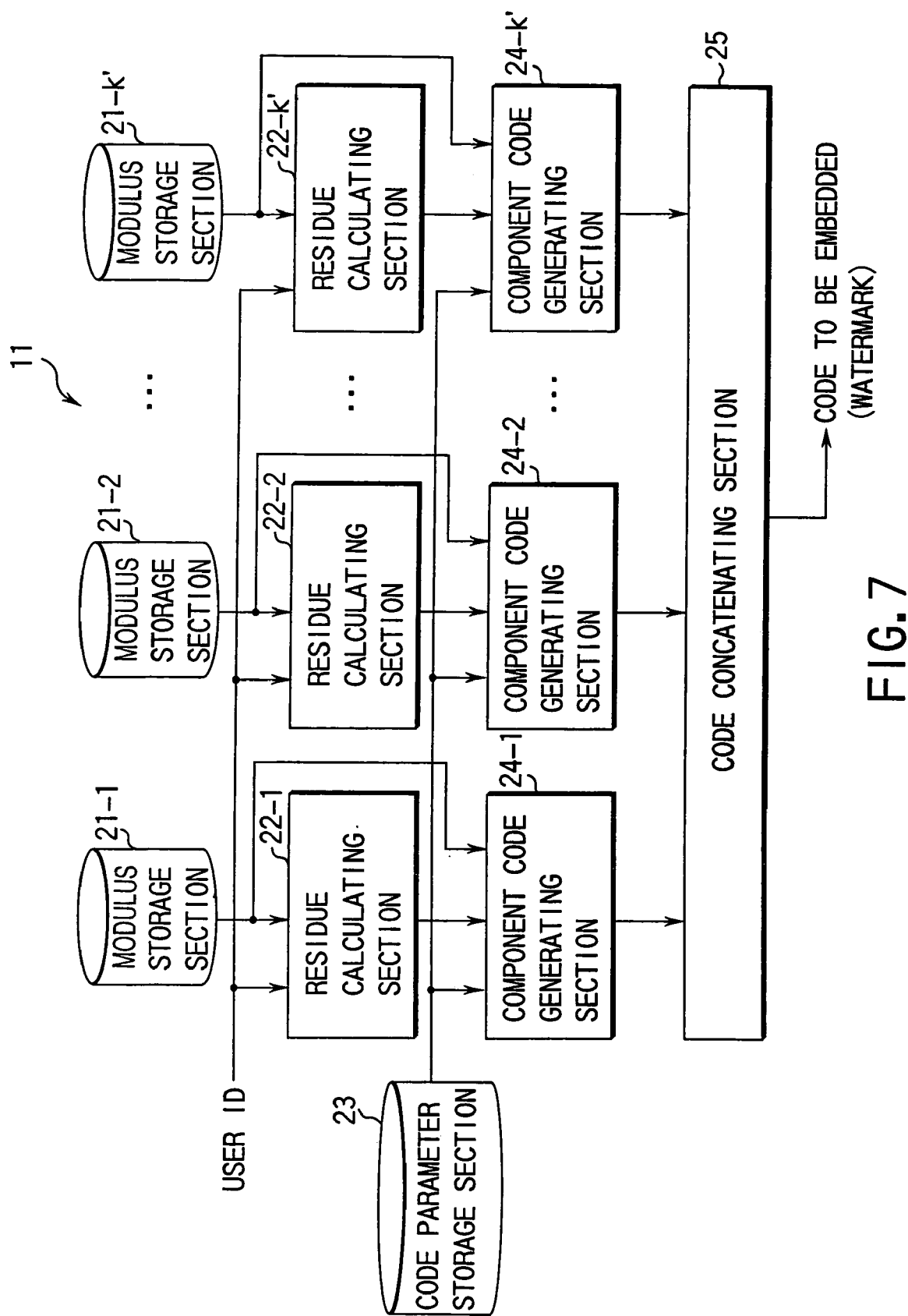
FIG. 7 is a block diagram showing the structure of the code generating section in FIG. 6.

FIG. 7 shows a structure of the code-generating section 11. This code generating section 11 is comprised of k' of modulus storage sections 21-1, 21-2, . . . , 21-$k'$ of residue calculating sections 22-1, 22-2, . . . , 22-$k'$ of component code generating sections 24-1, 24-2, . . . , 22-$k'$, a code parameter storage section 23, and a code concatenating section 25.

Integers which are relatively prime to each other are stored in the modulus storage sections 21-1, 21-2, . . . , 21-$k'$. In this example, k' different relatively prime numbers $p_i$ (i=1, 2, . . . , k') are stored. These relatively prime numbers $p_i$ are supplied as moduli to the residue calculating sections 22-1, 22-2, . . . , 22-$k'$. The residue calculating sections 22-1, 22-2, . . . , 22-$k'$ respectively obtain residues $u_i$=u mod $p_i$ (i=1, 2, . . . , k) with respect to a user ID u. That is, residues $u_i$=u mod $p_i$ (i=1, 2, . . . , k') are calculated as a set of a plurality of integral elements corresponding to an inputted user ID, by the residue calculating sections 22-1, 22-2, . . . , 22-$k'$.

The component code generating sections 24-1, 24-2, . . . , 24-$k'$ respectively generate component codes $\Gamma_0(p_i,t)$ consisting of $\Gamma_0(n,d)$ codes described above, which express the residues $u_i$ (i=1, 2, . . . , k') obtained by the residue calculating sections 22-1, 22-2, . . . , 22-$k'$ in accordance with a code parameter d stored in the code parameter storage section 23. That is, in the component code generating sections 24-1, 24-2, . . . , 24-$k'$, each of k combinations among k' component codes that can express all sets of the residues $u_i$ (i=1, 2, . . . , k') that are calculated by the residue calculating sections 22-1, 22-2, . . . , 22-$k'$ with respect to a predetermined number (n) of user IDs generates a component code $\Gamma_0(p_i,t)$ capable of uniquely expressing the user IDs, with respect to each residue.

The code concatenating section 25 concatenates the component codes $\Gamma_0(p_i,t)$ generated by the component code generating sections 24-1, 24-2, . . . , 24-$k'$, thereby to generate a code to be embedded as watermark information.

Figures 8, 9:
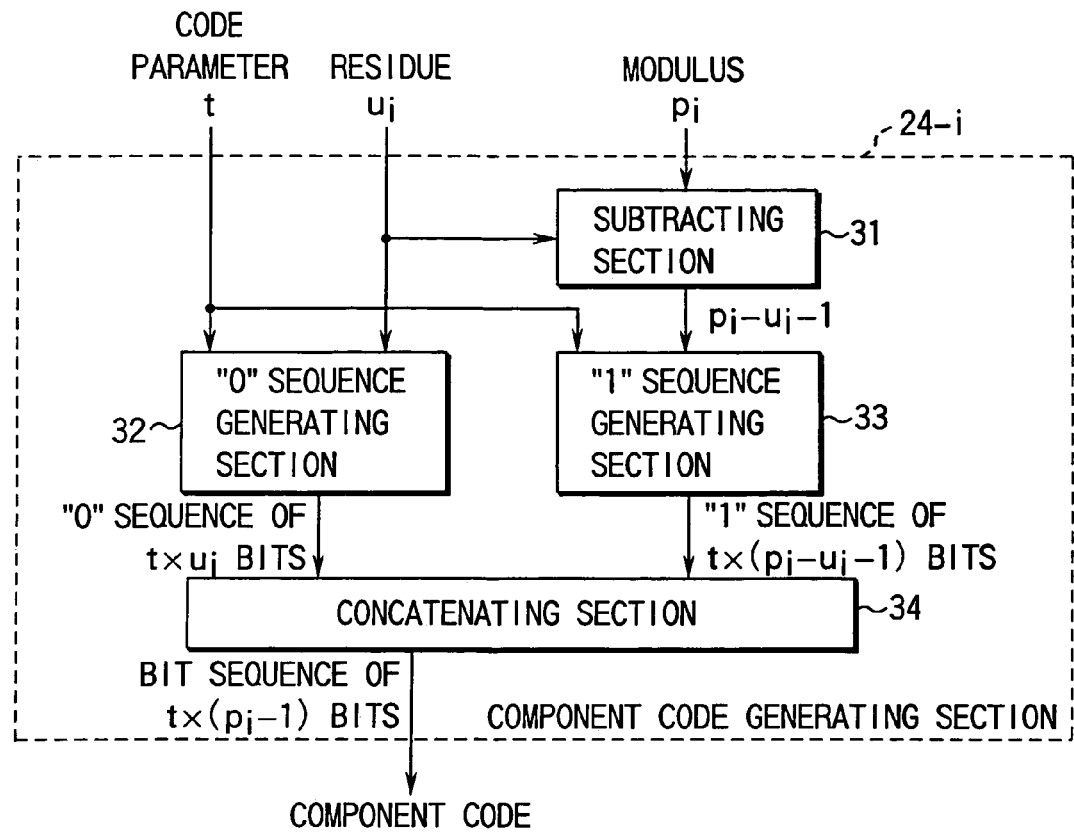
FIG. 8 is a block diagram showing the structure of the component code generating section in FIG. 7.
FIG. 9 shows values of component codes (component codes before collusion)

FIG. 8 shows the structure of one of the component code generating sections 24-1, 24-2, . . . , 24-$k'$. Where the code parameter is t, the residue is $u_i$, and the modulus is $p_i$, $p_i$-$u_i$-1 is obtained by a subtracting section 31. The "0" sequence generating section 32 generates a "0" sequence consisting of sequential t×$u_i$ bits, based on the code parameter t and the residue $u_i$. The "1" sequence generating section 33 generates a "1" sequence of sequential t×($p_i$-$u_i$-1) bits, based on the code parameter d and an output $p_i$-$u_i$-1 from the subtracting section 31. Further, these "0" and "1" sequences are concatenated by the concatenating section 34, so the a bit sequence of t×($p_i$-1) bits is generated as a component code $\Gamma_0(p_i,t)$ constructed by the $\Gamma_0(n,d)$ code.

FIG. 9 shows an example of component codes thus generated. Component codes of B(9), . . . , B(n-2) block "0" sequences are assigned to n user IDs from 0 to n-1.

Figure 10:
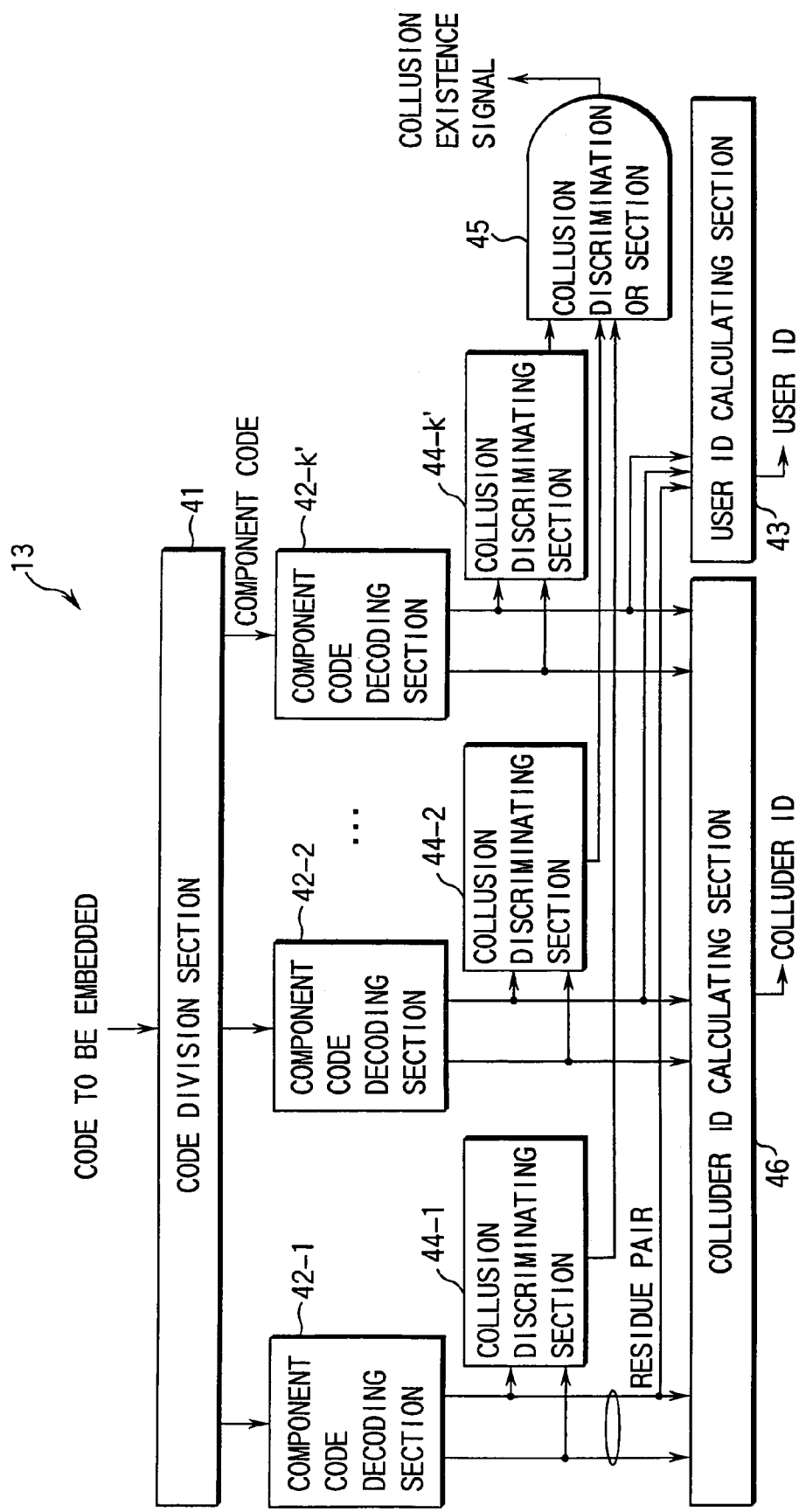
FIG. 10 is a block diagram showing the structure of the code detecting section in FIG. 6B.

FIG. 10 shows the structure of the embedded-code detecting section 14 in FIG. 6B. The embedded-code detecting section 14 is comprised of a code division section 41, component code decoding sections 42-1, 42-2, . . . , 42-$k'$, a user ID calculating section 43, collusion discriminating sections 44-1, 44-2, . . . , 44-$k'$, a collusion discriminating OR section 45, and a colluder ID calculating section 46.

An embedded code as watermark information extracted from a target content by the embedded-code extracting section 13 is divided into component codes by the code division section 41, which are thereafter decoded by the component code decoding sections 42-1, 42-2, . . . , 42-$k'$, thereby to generate residue pairs corresponding to a user ID.

From one residue of each residue pair thus generated, a user ID is calculated by the user ID calculating section 43. In addition, the collusion discriminating sections 44-1, 44-2, . . . , 44-$k'$ determine presence or absence of a collusion attack from the residue pairs, respectively. With respect to the determination results from the collusion discriminating sections 44-1, 44-2, . . . , 44-$k'$, a logical sum (OR) is calculated thereby to determine whether or not a collusion attack has existed. Further, if it is determined that a collusion attack exists, the colluder ID calculating section 46 calculates a colluder ID from each residue pair, and the colluder is thereby specified.

Figure 11:
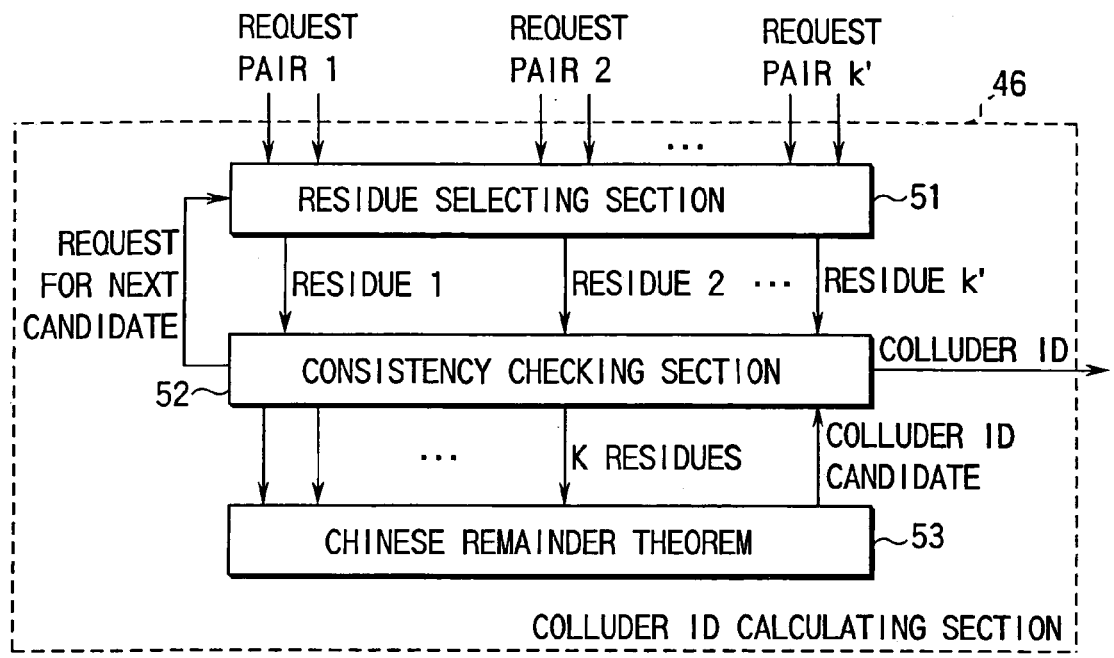
FIG. 11 is a block diagram showing the structure of the colluder ID calculating section in FIG. 10.

FIG. 11 shows a detailed structure of the colluder ID calculating section 46. The colluder ID calculating section 46 is comprised of a residue selecting section 51 for selecting one residue from each k' residue pairs, a consistency checking section 52 for selecting k residues among the selected k' residues, a Chinese remainder theorem section 53 for applying a Chinese remainder theorem to the k residues selected by the consistency checking section 52, thereby to obtain a colluder ID candidate.

Figure 12:
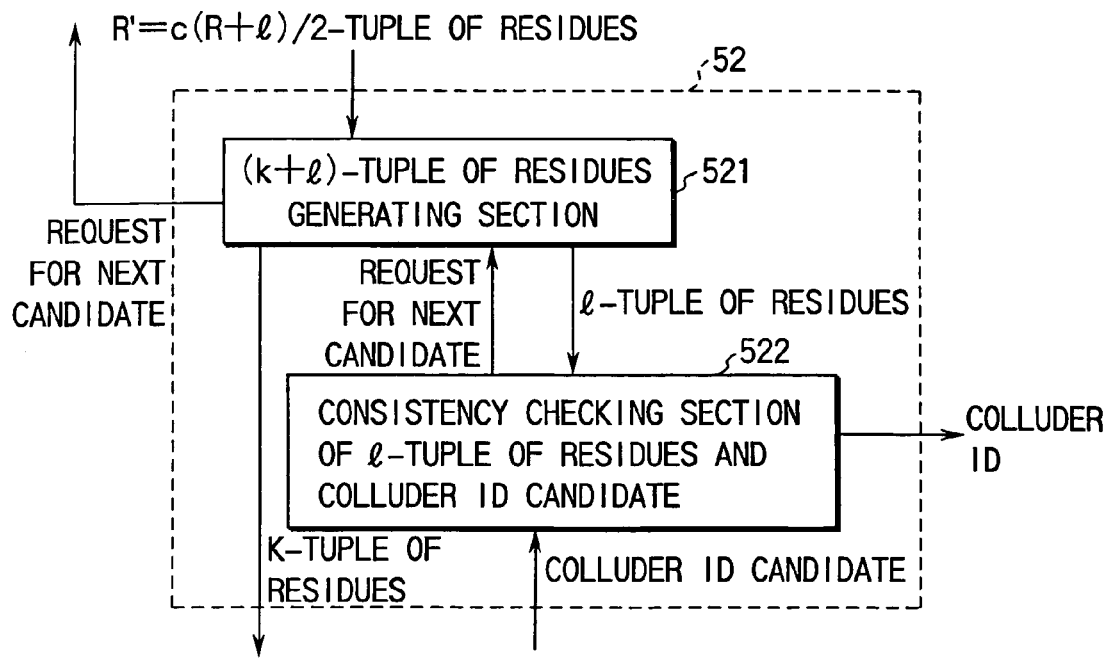
FIG. 12 is a block diagram showing the structure of the consistency checking section in FIG. 11.

FIG. 12 shows an internal structure of the consistency checking section 52 shown in FIG. 11. The colluder ID candidate obtained by the Chinese remainder theorem 53 is fed back to the consistency checking section 52, and a consistency check is carried out with respect to the other (k'-k) residues among the k' residues, so a colluder ID is obtained finally. The consistency checking section 52 shown in FIG. 12 is comprised of a generating section 521 for generating (k+l) sets of residues, and a consistency checking section 522 for a set of residues 1 and the colluder ID candidate. Operation of them will be explained later.

According to the watermark embedding unit and the watermark detecting unit in the present embodiment, watermarking is possible with less deterioration of the quality of contents even if the total number of users or colluders is large. Detailed explanation will be made below.

Suppose that n is the total number of users and c is the maximum value of the total number of colluders. Meanwhile, when arbitrary k elements are selected from k' relatively prime numbers $p_1, p_2, \ldots, p_{k'}$ prepared in the storage sections 21-1, 21-2, ..., 21-$k'$ shown in FIG. 7, the product of arbitrary k numbers in these k' relatively prime numbers are supposed to be n or more. For example, this product is $n \leq p_1 \times p_2 \times \ldots \times p_k$.

In the code generating section 12, component codes $\Gamma_0(p_i,t)$ are generated by the component code generating sections 24-1, 24-2, ..., 24-$k'$ shown in FIG. 7 with respect to the relatively prime numbers $p_i$ (i=1, 2, ..., k'). These component codes $\Gamma_0(pi,t)$ are concatenated by the code concatenating section 25, thereby to generate a new code $\Gamma(p_1, p_2, \ldots, P_k : n,t)$.

If the user ID of each user is supposed to be u, the codeword of the concatenated code $\Gamma(p_1, p_2, \ldots, p_k : n,t)$ is a codeword which expresses residues u mod $p_i$ calculated by the residue calculating sections 22-1, 22-2, ..., 22-$k'$ wherein each component code $\Gamma_0(p_i,t)$ takes the relatively prime number $p_i$ corresponding to its user ID u as modulus. This codeword is embedded as watermark information (or an embedded code) into a target content.

If a collusion attack may have been made on a code-embedded content thus obtained, the component codes $\Gamma_0(p_i,t)$ divided by code division section 41 are respectively decoded by the component code decoding sections 42-1, 42-2, ..., 42-$k'$, in the watermark detecting unit shown in FIG. 10, so that a pair of residues concerning $p_i$ of given two user IDs among c users. This will be called a residue pair concerning $p_i$.

Also, if a certain residue among a residue pair concerning $p_i$ is a residue of a colluder who maintains a certain user ID u, it will be said that the residue is caused by the colluder who is assigned the user ID u. At this time, with respect to a user who have a residue value equal to that of the colluder, including this colluder, it will be said that there is a possibility that the residue can be caused by the user ID of the user.

(Chinese Remainder Theorem)

Let Z be a set of all integers, if $u_i \epsilon Z/p_i^Z$ is given with respect to each of i (i=1, 2, ..., k) where different k prime numbers $p_1, p_2, \ldots, p_k$ are given, $u \epsilon (Z/p_1Z) \times (Z/p_2Z) \times \ldots \times (Z/p_kZ)$ which satisfies $ui \equiv u$ mod $p_i$ is uniquely decided, so calculations can be made inductively. This is the Chinese remainder theorem.

If the Chinese remainder theorem is adopted and if residues corresponding to arbitrary k relatively prime numbers among k' relatively prime numbers are supplied to the Chinese remainder theorem section 53, as shown in FIG. 11, a user ID can be determined uniquely therefrom. However, all the residues are not always caused from the user ID of one same colluder. Therefore, an obtained user ID does not always correctly specify a colluder.

Hence, another extra residue is prepared, and the consistency between (k+l) residues is checked thereby to verify the properness of the obtained user ID. In other words, a check is made on existence of a solution of (k+l) simultaneous congruent equations. For example, remainders are obtained by dividing a user ID obtained from k residues, by integers $p_{k+1}, \ldots, p_{k+l}$ corresponding to the other residues $r_{k+1}, \ldots, r_{k+l}$. A colluder can be determined depending on whether or not the remainders are respectively equal to the residues $r_{k+1}, \ldots, r_{k+l}$.

That is, in the consistency checking section 52 shown in FIG. 11, k'=c(k+l)/2 residues which are respectively selected from the k' residue pairs by the residue selecting section 51 shown in FIG. 11 are inputted to the generating section 521 for (k+l)-tuple of sets of residues, as shown in FIG. 12. From these k' residues, k residues are selected and supplied to the Chinese remainder theorem section 53. Further, a check is made on the consistency between a set of residues and a colluder ID candidate by the consistency check section 522, thereby to output a colluder ID (i.e., the user ID of a colluder).

In case where the total number of colluders is two, this method can be realized relatively easily (for example, Japanese Patent Applications No. 10-108039 and 10-122108). This is expanded to the number of general colluders.

Suppose that n is the total number of users and c is the maximum number of colluders. The n-secure code (cubic length n-secure code with $\epsilon$-error) having a $\epsilon$-error introduced in the reference [13] previously described is defined as follows.

(Definition 1)

A $((n-1)d,n)$ code $\Gamma_0(n,d)$ is defined as a code whose words $w^{(0)}, \ldots, w^{(n-1)}$ satisfy the next condition.

$$w^{(i)}|_{B_j} = \begin{cases} \{0\}^d & \text{for } i > j \\ \{1\}^d & \text{otherwise} \end{cases} \quad (3)$$

In this equation, $w^{(i)}|_{B_j}$ limits the codeword $w^{(i)}$ to a set $B_j$ of bit positions. A set $B_i$ (where i=0, ..., n-2) is called blocks and is constructed by d bit positions. Different blocks do not have a common part ($B_i \cap B_j = \phi$ with respect to $i \neq j$).

Suppose that ordering such as serial numbers can be assigned to all users. Suppose also that a codeword $w^{(i)}$ is assigned to the i-th user. Suppose further that user are not informed of the serial numbers assigned to themselves.

The linear length n-secure code with $\epsilon$-error, which has been introduced in the references [12] and [14], is the same as the code defined by the definition 1 but has a different detection algorithm. This code is capable of specifying two colluders one of which has the maximum serial number and the other of which has the minimum serial number. The code length thereof is $\Theta(n)$.

(Theorem 1)

Suppose that the following detection algorithm 1 is applied to the code $\Gamma_0(n,d)$. If $d=\log_2(2/\epsilon)$ is given, this code is a n-secure code with $\epsilon$-error.

(Detection Algorithm 1)

(1) Input a detected code $x \epsilon \{0,1\}^l$. Suppose that $l=(n-1)d$ and $d=\log(2/\epsilon)$ are given.

(2) Execute the following from s=0 to n-2.

(2-1) Stop if $x|_{B_s} \neq \{0\}^d$ (3) Execute the following from t=n-1 to s.

(3-1) Interrupt if $x|B_{t-1} \neq \{0\}^d$ (4) Output s and t.

The algorithm portion peculiar to the present invention will now be described.

Suppose that k, k', and l are positive integers that satisfy k'=c(k+l)/2. Suppose also that $p_1, \ldots, p_{k'}$ are integers that are relatively prime to each other. Suppose also that p is the minimum one of $p_1, \ldots, p_{k'}$. Suppose also that the product of k smallest integers selected from $p_1, \ldots, p_{k'}$ is n or more. These integers $p_1, \ldots, p_{k'}$ will be called factors hereinafter. The set of these integers will be called factor basis.

The average value of these factors is supposed to be $p_{ave}$ ($p_{ave}=(p_1+ \ldots +p_{k'})/k'$). Corresponding to each of $p_i$ (i=1, \ldots, k'), the n-secure code $\Gamma_0(pi,t)$ according to the reference [13] is prepared as a code for a component.

(Definition 2)

A (($p_{ave}$−1)k't,n) code $\Gamma(p_1 \ldots, p_{k'}; n,t)$ is defined as a code in which its codewords $W^{(1)}, \ldots W^{(n)}$ are constructed as follows.

$w^{(u)}|_{Ci} = w^{(u \bmod pi)} \epsilon \Gamma_0(p_i,t)$

Here, $C_i$ is a set of bit positions corresponding to the code $\Gamma_0(p_i,t)$. This code is assigned to the u-the user.

A coding algorithm for generating an embedded code is as follows.

(Coding Algorithm)

(1) Input user ID $u^\epsilon\{0, \ldots, n-1\}$.

(2) Execute the following from i=1 to k'.

(2-1) Calculate u mod $p_i$ and generate codewords $w(u \bmod p_i) \epsilon \Gamma_0(p_i,t)$.

(3) Concatenate the generated codewords to make one codeword $W^{(u)}$.

(Definition 3)

At most, two integers $r_i^{(-)}, r_i^{(+)} \epsilon Z_{pi}$ are obtained by applying a detection algorithm 1 to the components of $\Gamma(p1, \ldots, pk'; n,t)$. In this definition, $0 \leq r_i^{(-)} \leq r_i^{(+)} \leq p_i - 1$ is given.

The integers $r_i^{(-)}, r_i^{(+)} \epsilon Z_{pi}$ are called residues of $\Gamma_0(p_i,t)$. A set $\{r_i^{(-)}, r_i^{(+)}\}$ is called a residue pair of $\Gamma_0(p_i,t)$.

(Definition 4)

Suppose that r is a residue of $\Gamma_0(p_i,t)$. If a colluder who satisfies r≡u mod $p_i$ exists among a set of colluders, the residue r is called r which arises from u. If r satisfies r≡u mod $p_i$ regardless of whether or not a user is a colluder, the residue r is called r which possibly arises from u.

(Definition 5)

If all of a set of m residues give one same user ID when the Chinese remainder theorem is applied to arbitrary k residues among the set of residues corresponding to m relatively prime numbers (m-tuple of residues), this kind of set is called to be consistent.

Further, if all residues of a consistent set of residues arise from the user ID of an obtained colluder, the set of residues is called to be truly consistent. Otherwise, this set of residues is called to be falsely consistent.

(Detection Algorithm 2)

(1) Input a detected code $x \epsilon \{0,1\}^L$. Suppose that L=($p_{ave}$−1)k't (2) Decompose x into k' limited $x|_{Ci}$, i=1, \ldots, k'.

(3) Execute the following from i=1 to k'.

(3-1) Apply the detection algorithm 1 to $x|_{Ci}$.

(4) Execute the following with respect to all m-tuple of a set of residues.

(4-1) Execute the following if the set of m-tuple of residues is consistent.

(4-2) Output its solution as a colluder and stop.

(5) Make an output saying that no colluder has been detected.

(Theorem 2).

Suppose $t \geq \log_2(4k'/\epsilon)$. If the following equation is satisfied, the code $\Gamma(p1, \ldots, pk'; n,t)$ is a c-secure code with $\epsilon$-error.

$$\left[1 - \left\{1 - \left(1 - \frac{1}{p}\right)^c\right\}^{l'}\right]^{k'C_{k+l}2^{k+l}} > 1 - \frac{\epsilon}{2} \quad (4)$$

At this time, the code length is given by L=($p_{ave}$−1)k't.

(Lemma 1)

Among k' residue pairs of the code $\Gamma(p_1, \ldots, p_{k'}; n,t)$, at least one colluder who raises. 2k'/c residues exists.

(Proof of Lemma 1)

There are 2k' residues that are contained in k' residue pairs of the $\Gamma(p_1, \ldots, p_{k'}; n,t)$. When averaged, 2k'/c residues arise per one colluder. Accordingly, at least one colluder raises 2k'/c or more residues.

(Generalization of Lemma 1)

Lemma 1 shows an example where the number q of integral elements (residues) that can be detected from each component code is set to q=2. This lemma can be generated with use of q as follows.

(Proof of Generalized Lemma 1)

Residues that are contained in q residue pairs (which are called pairs herein for conveniences although they are not strictly pairs) of k' codes $\Gamma(p_1, \ldots, p_{k'}; n,t)$ are qk' pieces. When averaged, qk'/c residues are raised per colluder. Accordingly, at least one colluder raises qk'/c or more residues.

Since reconstruction and inspection of a colluder ID (the user ID of a colluder) require (k+l) residues, qk'/c≥k+l must exist from a result of the generated lemma 1. The factor q/c in the left side is shifted to the right side of the inequality. A condition k'≥c(k+l)/q is obtained. Actually, since k' is an integer, k'≥[c(k+l)/q].

(Lemma 2)

Suppose $t \geq \log_2(2k'/\epsilon)$. When the above-described detection algorithm 1 is applied to the code $\Gamma(p_1, \ldots, p_{k'}; n,t)$, the approval error rate of k' residue pairs (the probability at which a residue that does not arise from any colluder is contained in k' residue pairs) is $\epsilon$ or less.

(Proof of Lemma 2)

When the detection algorithm is applied to an element $\Gamma_0(p_i,t)$, the detection error rate of residue pairs is $\epsilon/k'$ or less if $t \geq \log_2(2k'/\epsilon)$ is given from the theorem 1. Since total k' elements exist, the detection error rate is $\epsilon$ or less with respect to all residue pairs.

(Lemma 3)

When a consistent set of m residues (m-tuple of residues) and a residue from a residue pair corresponding to another factor p is added to this set to construct a set of (m+1) residues, the probability at which the (m+1) residues of this set is falsely consistent is $1-(1-1/p)^c$ or less.

(Proof of Lemma 3)

Each residue pair is constructed by the maximum and minimum values among residues taking p with respect to user IDs of all colluders, as modulus. Since users do not know their own user IDs, it is expected that the probability at which a user ID belongs to a colluder when a collusion attack is carried out is considered to be uniform independently from the user ID. Accordingly, the probability at which a residue of a colluder takes a certain value is equally l/p.

When residues of c colluders are all distributed uniformly, the probability Pr[x] at which the maximum residue takes a certain value c∈Z/pZ is given as follows.

$$\Pr[x] = \begin{cases} \left(1 - \frac{x}{p}\right)^c - \left(1 - \frac{x+1}{p}\right)^c & \text{for } x \neq p-1 \\ \left(\frac{1}{p}\right)^c & \text{for } x = p-1 \end{cases} \quad (5)$$

(Lemma 4)

When the following condition is satisfied, the probability at which a falsely consistent set of (k+l) residues exists is ε or less as indicated by the next equation.

$$[1 - \{1 - (1 - 1/p)^c\}^l]^{c(k+l)/2} C_{k+l} \times 2^{k+l} > 1 - \varepsilon \quad (6)$$

(Proof of Lemma 4)

A set of (k+l) residues that can be selected from k' residue pairs can take ${}_kC_{k+l} \times 2^{k+l}$ combinations. From the lemma 14, the probability at which the set of (k+l) residues is falsely consistent is $(1-(1-1/p)^c)l$. Accordingly, an upper limit described below is given to the probability at which at least one falsely consistent set of (k+l) residues appears in all combinations.

$$P_F \leq 1 - [1 - \{1 - (1-1/p)^c\}^l]^{k'C_{k+l} \times 2^{k+l}} \quad (7)$$

When the condition equation of the lemma 1 exists, the probability $P_F$ is ε or less.

(Proof of Theorem 2)

There are two causes that make an innocent user erroneously detected as a colluder. One is a detection error of a residue pair, and the other is a selection of a falsely consistent set of residues. If the probabilities of these two causes are each ε/2 or less, the detection error rate is ε or less. From the lemmas 2 and 4, the equation of the upper limit is obtained.

In place of using a minimum factor as a lower limit to restrict the probability at which a falsely consistent set of residues is excluded, l factors from the smallest one are used to restrict the lower limit. Then, a much smaller upper limit which has a code length as shown in the next equation (8) can be obtained, in place of the equation (4).

$$\left[1 - \prod_{i=1}^{l}\left\{1 - \left(1 - \frac{1}{p_i}\right)^c\right\}\right]^{c(k+l)/2 C_{k+l} \times 2^{k+l}} \geq 1 - \frac{\varepsilon}{2} \quad (8)$$

Here, $p_1, \ldots, p_l$ are l smallest parameters selected from $p_1, \ldots, p_{k'}$ (where $p_1 < p_2 \ldots < p_k$). The l parameters may be selected in the order from the smallest one, one selected in the order from the smallest one from the (k+1)-th one up to the (k+l)-th smallest one, or the l parameters selected in the order from the smallest one up to the (k+l)-th smallest one. In addition, pi (i=1, 2, ..., k') is a value which each residue (integral element) calculated by the residue calculating section with respect to c user IDs can take. In the present embodiment, pi (i=1, 2, ..., k') are k' factors prepared by the modulus storage sections 21-1, 21-2, ..., 21-k' described previously.

The meaning of the equation (8) will now be explained. At first, the left hand side of the equation (8) gives a lower limit to the probability at which a detection correctly specifies a colluder ID. That is, the "power" attached to the shoulder of the bracket in the left hand side cites an example where (k+l) residues are selected from k' residue pairs. The entire of the right hand side means the moderation of the probability at which whether or not a colluder ID is correct or not is made with respect to each selection.

The contents of the bracket in the left hand side of the equation (8) will be explained in details. In each of the selections described above, whether or not a collusion ID is correct is approved by l extra residues. The part of the product depending on Π in the bracket gives an upper limit to the probability at which an incorrect colluder ID is mistaken as being correct by all of l approvals. This is because the lower limit of the probability at which each approval determines an incorrect colluder ID as being correct is given by a result obtained by replacing the number p of integral elements (residues) that can be detected from each component code, with a factor corresponding to the residues, with respect to the given probability $1-(1-1/p)^c$ in the lemma 3.

The l factors corresponding to the residues used for an approval is a combination which maximizes the lower limit of the probability at which an incorrect approval is carried out by the combination, in case where the combination comprised of the smallest factors is $p_1, p_2, \ldots, pl$. Therefore, the product part based on Π gives an upper limit to the probability at which all of l approvals mistakes an incorrect colluder ID as being correct. Therefore, in the equation. (8), the lower limit of the probability at which a correct colluder ID is detected, expressed in the left hand side, means a condition for satisfying 1−ε/2 or more, expressed in the right hand side.

Thus, according to the present embodiment, the number k' of the component code is defined such that the condition equation k'≧(k+l)/q given by the generalized lemma 1 described above, and more preferably, such that the equation (8) is satisfied. As a result, if a resistance to a collusion attack is maintained and if three of more colluders participate in an alteration, a sufficient and proper embedded-code can be generated on the basis of correct evaluation of an error rate, and the embedded-code can be properly decoded.

Figure 13:
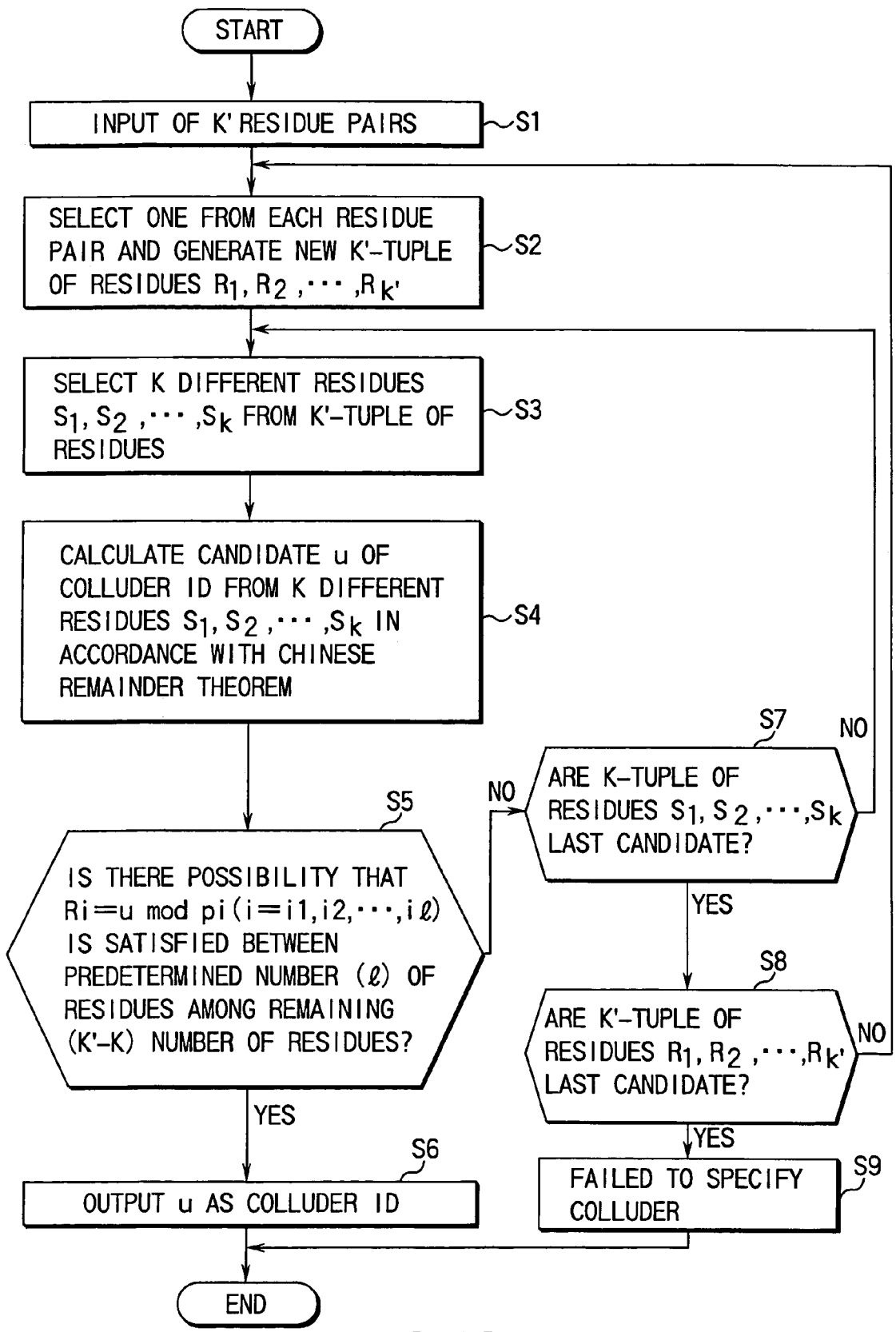
FIG. 13 is a flowchart showing a colluder specifying algorithm in the first embodiment.

Next explanation will be made of an algorithm which specifies a colluder in the present embodiment, with reference to the flowchart in FIG. 13.

The colluder ID calculating section 46 inputs k' residue pairs outputted from the component code decoding sections 42-1, 42-2, ..., 42-k'. The residue pairs are at first inputted to the residue selecting section 51. The residue selecting section 51 (step S1) selects one residue from each residue pair, to generate a set of k residues $(R_1, R_2, \ldots, R_{k'})$ (step S2).

The set of k' residues is inputted to the consistency checking section 52. The consistency checking section 52 selects different k residues $(S_1, S_2, \ldots, S_k)$ (step S3) and supplies them to the Chinese remainder theorem section 53.

Figure 14:
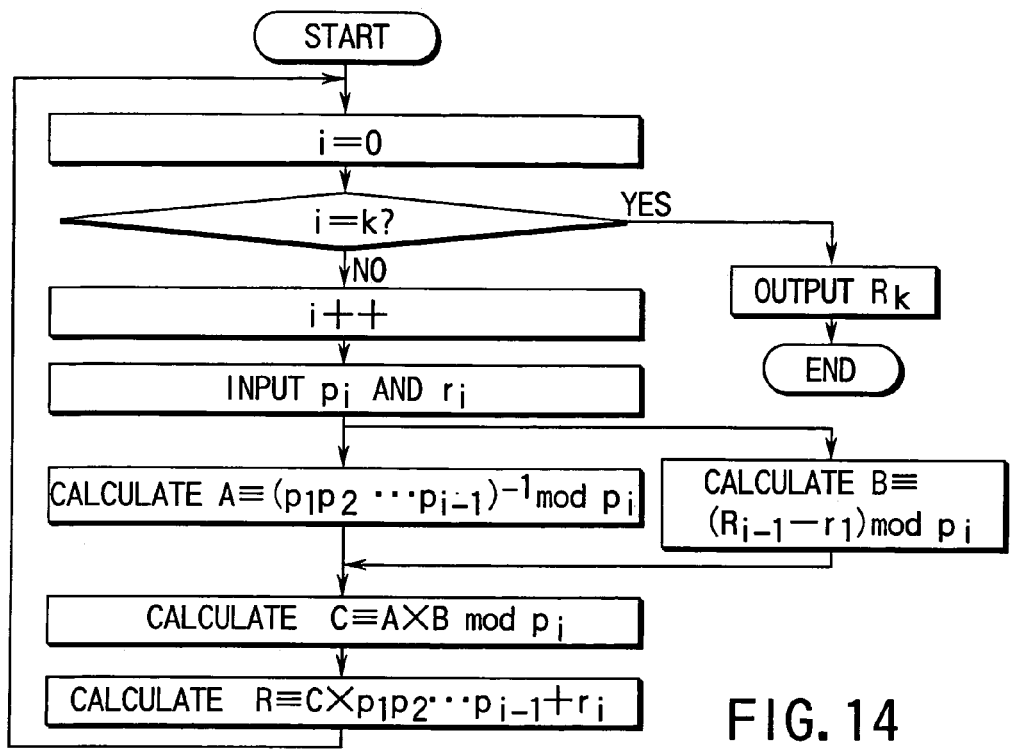
FIG. 14 is a flowchart showing the processing flow in the Chinese remainder theorem section in FIG. 10.

The Chinese remainder theorem section 53 calculates a colluder ID u in accordance with the Chinese remainder theorem (step S4). The calculation using this Chinese remainder theorem is executed in accordance with the processing flow shown in the flowchart of FIG. 14. The calculated collusion ID u is returned to the consistency checking section 52.

The consistency checking section 52 determines whether or not there is a case that a relation of $R_i = u \bmod p_i$ ($i = i_1, i_2, \ldots, i_l$) is satisfied between a predetermined number (l) of residues among the other remaining (k'-k) residues (step S5). If this relationship is satisfied, the consistency checking section 52 outputs u as a colluder ID (step S6). If the relationship is not satisfied, new different k residues ($S_1, S_2, \ldots, S_k$) are selected from a set of k' residues inputted in the step S3 and are supplied to the Chinese remainder theorem section 53 until it is satisfied.

If it is determined in the step S7 that a set of k residues ($S_1, S_2, \ldots, S_k$) is the last candidate, the consistency checking section 52 request a new set of k' residues from the residue selecting section 51 (step S8). Until the relationship of $R_i = u \bmod p_i$ ($i = i_1, i_2, \ldots, i_l$) is satisfied in the step S5, the processing of the steps S3, S4, and S7 is repeated. If there is no new set of k residues ($S_1, S_2, \ldots, S_k$), it is considered that the processing has failed to specify a colluder (step S9).

Figure 15:
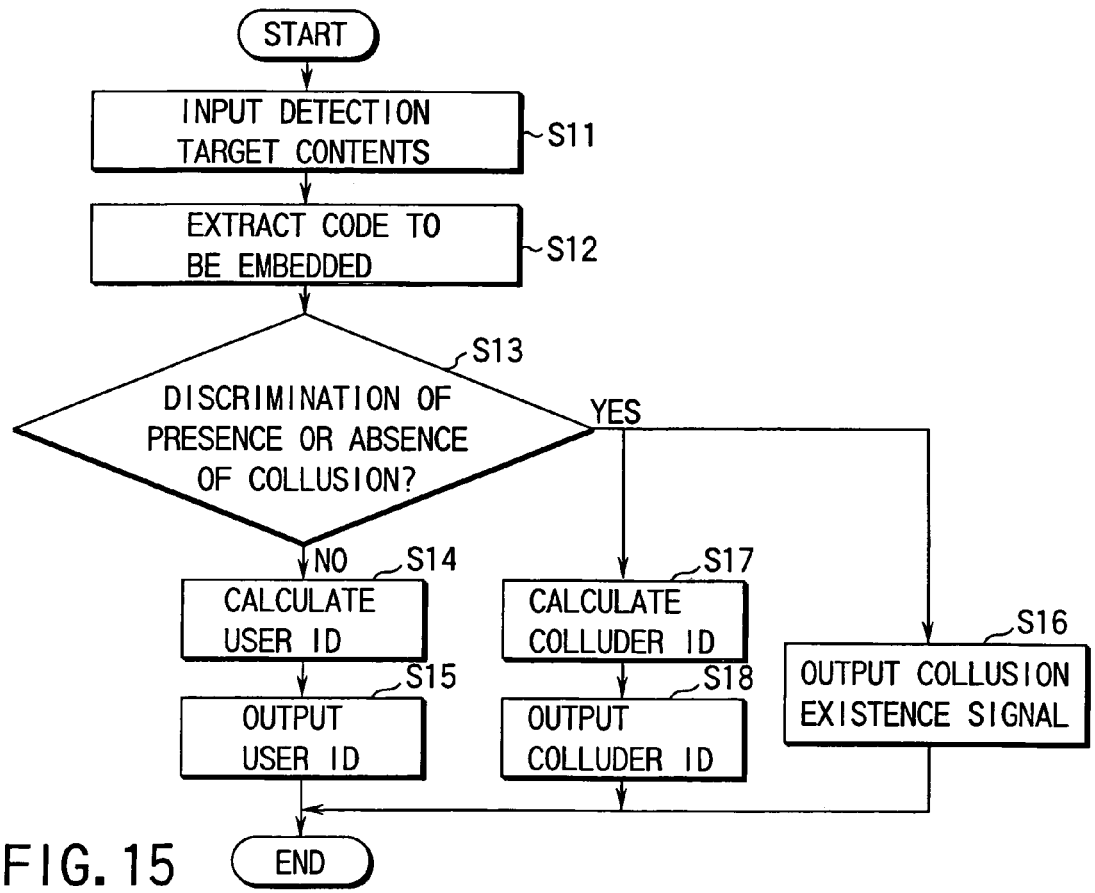
FIG. 15 is a flowchart showing the processing flow in the code generating section according to the second embodiment of the present invention.

At last, explanation will be made of the processing flow in the embedded-code detecting section 14 in the present embodiment, with reference to the flowchart shown in FIG. 15.

A detection target content (e.g., a code-embedded content) is inputted (step S11), and an embedded code is extracted from this detection target content (step S12). Then, the collusion discriminating sections 44-1, 44-2, . . . , 44-k' determine presence or absence of a collusion, based on component codes obtained through the code division section 41 and the component decoding sections 42-1, 42-2, . . . , 42-k' (step S13).

If none of the collusion discriminating sections 44-1, 44-2, . . . , 44-k' determines presence of a collusion, a user ID is calculated by the user ID calculating section 43 (step S14), and this user ID is outputted (step S15).

Otherwise, if at least one of the collusion discriminating sections 44-1, 44-2, . . . , 44-k' determines presence a collusion attack, a collusion existence signal is outputted through the collusion discriminating section 45 (step S16), and the colluder ID calculating section 46 calculates a colluder ID (step S17). This colluder ID is outputted (step S18).

In this case, processing can be carried out easily at a high speed, with respect to the determination of presence or absence of a collusion attack in the step S13 and the calculation of the user ID in the step S14. On the contrary, the calculation of a colluder ID in the step S17 takes a long time although wasteful calculations can be omitted by firstly executing a determination of presence or absence of a collusion attack and by executing the calculation of a colluder ID only in case where presence of a collusion attack is determined.

If the watermark detecting unit according to the present invention is applied to a user device, use of the unit may be controlled, e.g., determination is made only on the presence or absence of a collusion attack, and use of the unit is stopped depending on the result of the determination. Therefore, calculation (specification) of a colluder need not always be carried out.

Thus, according to the present embodiment, robustness to collusion attacks can be maintained in case where the total number of users or colluders is large while the code length of a code to be embedded is restricted.

SECOND EMBODIMENT

Figure 16:
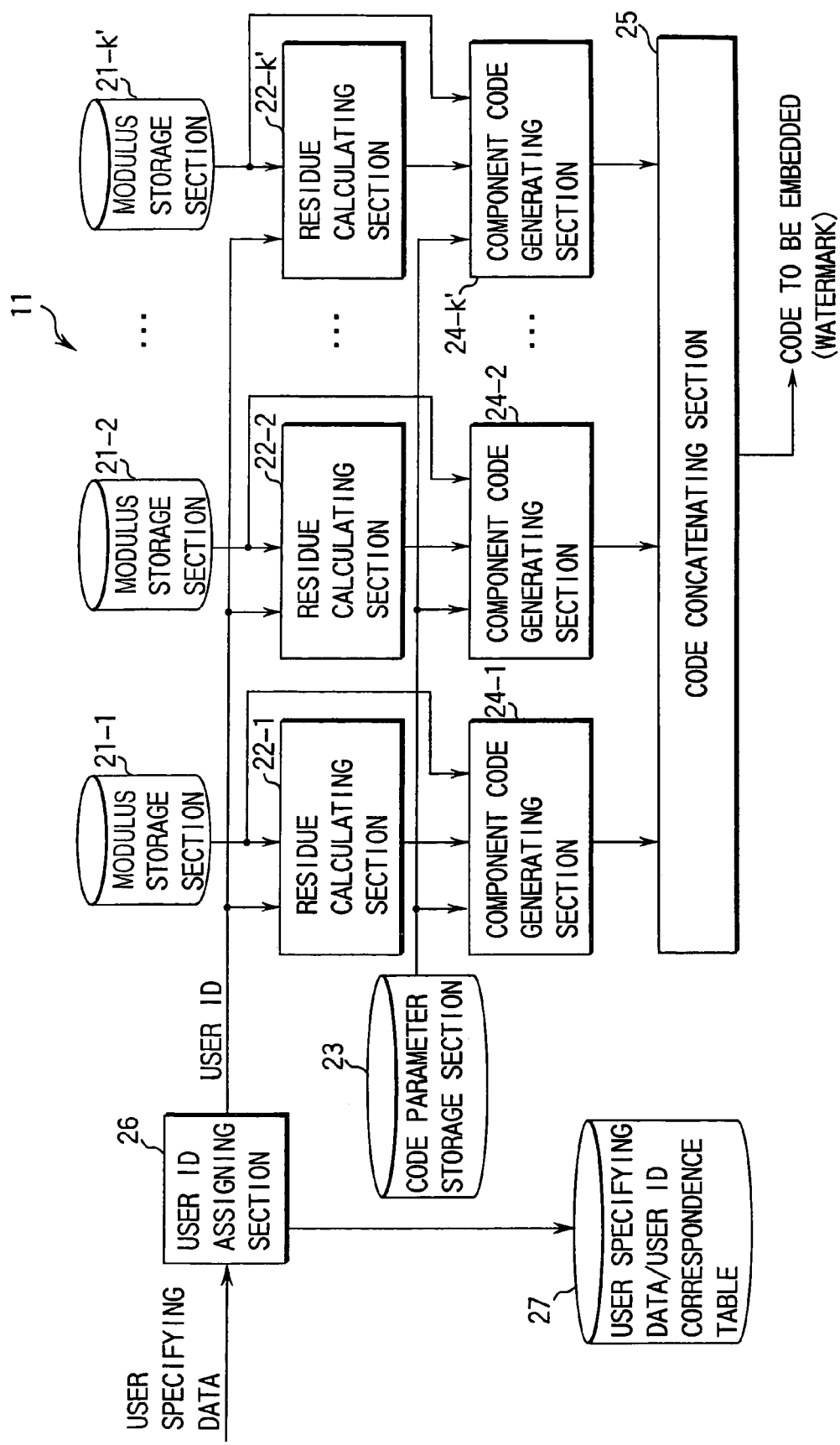
FIG. 16 is a block diagram showing the structure of the code generating section according to the second embodiment of the present invention.

FIG. 16 shows a structure of a code generating section 11 according to the second embodiment of the present invention. In the code generating section 11 according to the present embodiment, the structure shown in FIG. 7 is added with a user ID assigning section 26 for assigning a user ID to user specifying data which specifies a user of contents, and a user-specifying-data/user-ID correspondence table 26 which stores user specifying data and user IDs assigned by the user ID assigning section 26 with correspondence maintained therebetween.

In the user ID assigning section 26, a user ID is assigned to inputted user specifying data., as described later. The assigned user ID is inputted to the residue calculating sections 22-1 to 22-k'. Also, the user-specifying-data/user-ID correspondence table 27 stores the user specifying data and the assigned user ID.

Figure 17:
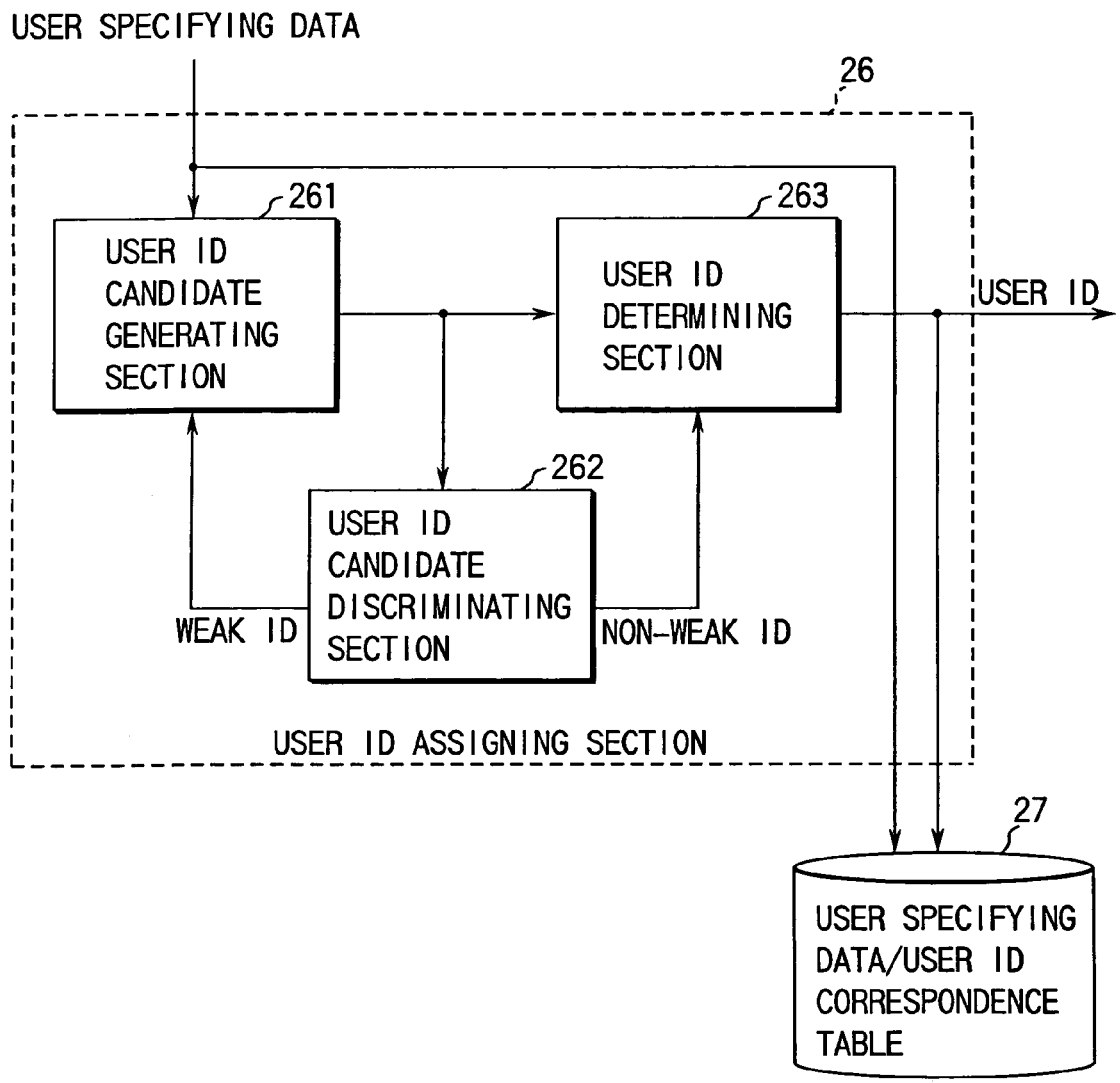
FIG. 17 is a block diagram showing the structure of the user ID assigning section in FIG. 16.

As shown in FIG. 17, the user ID assigning section 26 is comprised of a user ID candidate generating section 261, a user ID candidate discriminating section 262, and a user ID determining section 263. With reference to the flowchart shown in FIG. 18, the processing procedure of the user ID assigning section 26 will be explained.

At first, user specifying data is inputted (step S21). The user specifying data is unique to each of individual users, and for example, the name of a user is used as the user specifying data. Corresponding to the user specifying data, the user ID candidate generating section 261 generates user ID candidates one after another (step S22). Used as the user ID candidates are IDs which are not yet assigned (or used).

Next, whether or not the user ID candidate is a weak ID is discriminated with respect to the user IDs sequentially by the user ID candidate discriminating section 262 (step S23). A weak ID is such a user ID that can be erroneously detected as a colluder ID at a high probability although the user ID is not a colluder ID among a plurality of user ID candidates, i.e., although the user ID is the user ID of an innocent user (who is not a colluder). From the meaning that the user ID is weak against erroneous detection, it is called a weak ID. If a user ID candidate is discriminated as a weak ID as a result of discrimination in the step S23, the processing returns to the step S22 where a next user ID candidate is generated, and discrimination is then made again in the step S23.

If a user ID candidate is not a weak ID as a result of discrimination in the step S23, i.e., if a user ID candidate is a user ID which is erroneously detected as a colluder ID at a lower possibility (this kind of user ID is called a non-weak ID with the meaning of an ID which is not weak against erroneous detection), the user ID candidate determining section 263 determines the user ID candidate as a user ID to be assigned to the user specifying data inputted through the step S21 (step S24).

With reference to the flowchart shown in FIG. 19, explanation will be made of a specific procedure of discrimination processing in the step S23 of discriminating whether a user ID candidate is a weak ID or a non-weak ID.

At first, user ID candidates generated in the step S22 are sequentially inputted one after another (step S31), and the probability (detection error rate) at which each of the user ID candidate is erroneously detected as a colluder ID is estimated (step S32). For example, the estimation of the detection error rate is carried out as follows with use of parameters $p_i$, k, k', and c. At first, the following equation is defined.

$$\Pr[x; p, c] = \begin{cases} \left(1 - \frac{x}{p}\right)^c - \left(1 - \frac{x+1}{p}\right)^c & \text{for } x \neq p-1 \\ \left(\frac{1}{p}\right)^c & \text{for } x = p-1 \end{cases} \quad (9)$$

Next, the following is defined.

$$Q[x; p, c] = \Pr[x; p, c] + \Pr[p-1-x; p, c] \quad (10)$$

The following evaluation value EEF is calculated as an amount which expresses substantially the probability at which a user ID (set as u) is erroneously detected as a colluder ID.

$$EEP = 1 - \prod_{\substack{\{j(1), j(2), \ldots, j(k+l)\} \\ \subset \{1, 2, \ldots, k'\}, \\ j(1) < j(2) < \ldots < j(k+l)}} \left\{ 1 - \prod_{i=1, 2, \ldots, k+l} Q[u_{p_{j(i)}}; pj(i), c] \right\} \quad (11)$$

Let up≡u mode p and up∈Z/PZ. If another evaluation value that approximates the detection error probability with respect to a user ID exists except for the above-mentioned evaluation value, it can be used in place of the EEP in the equation (11). For example, it is possible to use an evaluation value EEP represented by the following equation (12).

$$EEP = \sum_{i=1, \ldots, k'} Q[u_{pi}; p_i, c] \quad (12)$$

Next, whether or not the detection error rate (e.g., the EEP in the equation (11) or (12)) estimated in the step S32 exceeds a predetermined threshold value is checked (step S33). If it exceeds the threshold value, the user ID candidate is determined as a weak ID (steps S34). Otherwise, if the detection error rate is equal to or smaller than the threshold value, the user ID candidate is determined as a non-weak ID (step S35).

Thus, in the user ID assigning section 26 shown in FIG. 16, an ID (non-weak ID) which is hardly detected erroneously as a colluder ID among a plurality of user ID candidates is assigned as a user ID to inputted user specifying data. Thereafter, the user ID assigned by the user ID assigning section 26 is subjected to processing sequentially by the residue calculating sections 22-1 to 22-k' and the component code generating sections 24-1 to 24-k', like the first embodiment. Thus, a code to be embedded is generated.

In other words, the user ID assigning section 26 is arranged such that a weak ID which is easily detected erroneously as a colluder ID among a plurality of user ID candidates might not be assigned as a user ID to inputted user specifying data. In this manner, the probability of erroneous detection can be reduced to be small. It may be arranged such that, if a weak ID should be detected as a colluder ID, it may not be taken as a colluder ID.

Meanwhile, a weak ID makes a large influence on determination of the code length of an embedded code. Suppose that a user ID is detected in a watermark detecting unit. It is necessary to prepare a factor base consisting of a very large number of factors (e.g., integers which are stored in the modulus storage sections 21-1, 21-2, . . . , 21-k' and which are relatively prime to each other, such as k' different relatively prime numbers pi (i=1, 2, . . . , k')), in order to reduce the detection error probability to be smaller than a tolerable probability, even if the user ID is a weak ID. However, if an embedded code has some detection error probability without excluding weak IDs, an equivalent detection error rate can be realized by an embedded code having a factor basis consisting of much less factors, by excluding weak IDs from user IDs.

This can be explained as follows. Where a given user ID is u, an event that u is detected is expressed as detect(u), an event that u is a weak ID is expressed as weak(u), and an event that u is a colluder ID is expressed as collude(u). At this time, the following exists.

detect(u)=detect(u)∧weak(u)∧collude(u)∧detect(u)∧
weak(u)∧¬collude(u)∧detect(u)∧¬weak(u)∧
collude(u)∧detect(u)∧¬weak(u)∧¬collude(u)  (13)

Therefore, the following is given.

$Pr$[detect($u$)]=$Pr$[detect($u$)∧weak($u$)∧collude($u$)]+
$Pr$[detect($u$)∧weak($u$)∧¬collude($u$)]+
$Pr$[detect($u$)∧¬weak($u$)∧collude($u$)]
$Pr$[detect($u$)∧¬weak($u$)∧¬collude($u$)]  (14)

In these equations, the second and fourth terms in the right hand side in the equation (14) contribute to the detection error rate. To shorten the code length, it is preferable to adopt a method in which an approval of a colluder ID candidate can be made by a much smaller number (k') of factors, without reducing the detection error rate. In case where an approval of a colluder ID candidate is made simply by a smaller number of factors, the fourth term in the right hand side of the equation (14) does not much change but the probability of the second term greatly increases, so that the detection error rate is increased.

However, if weak IDs are previously excluded so that weak IDs might not be assigned as user IDs, the second term in the right hand side of the equation (14) is not incorporated in the detection error rate. If a user ID list of colluder ID candidates is prepared in the embedded code detection section 14 which will be described later and if pre-excluded weak IDs are excluded from the detected user ID list, the probability at which the remaining non-weak IDs are Ids of correct colluders becomes high. Therefore, by determining the non-weak ID as a colluder ID, an embedded code having a short code length can be obtained as a result.

Figure 20:
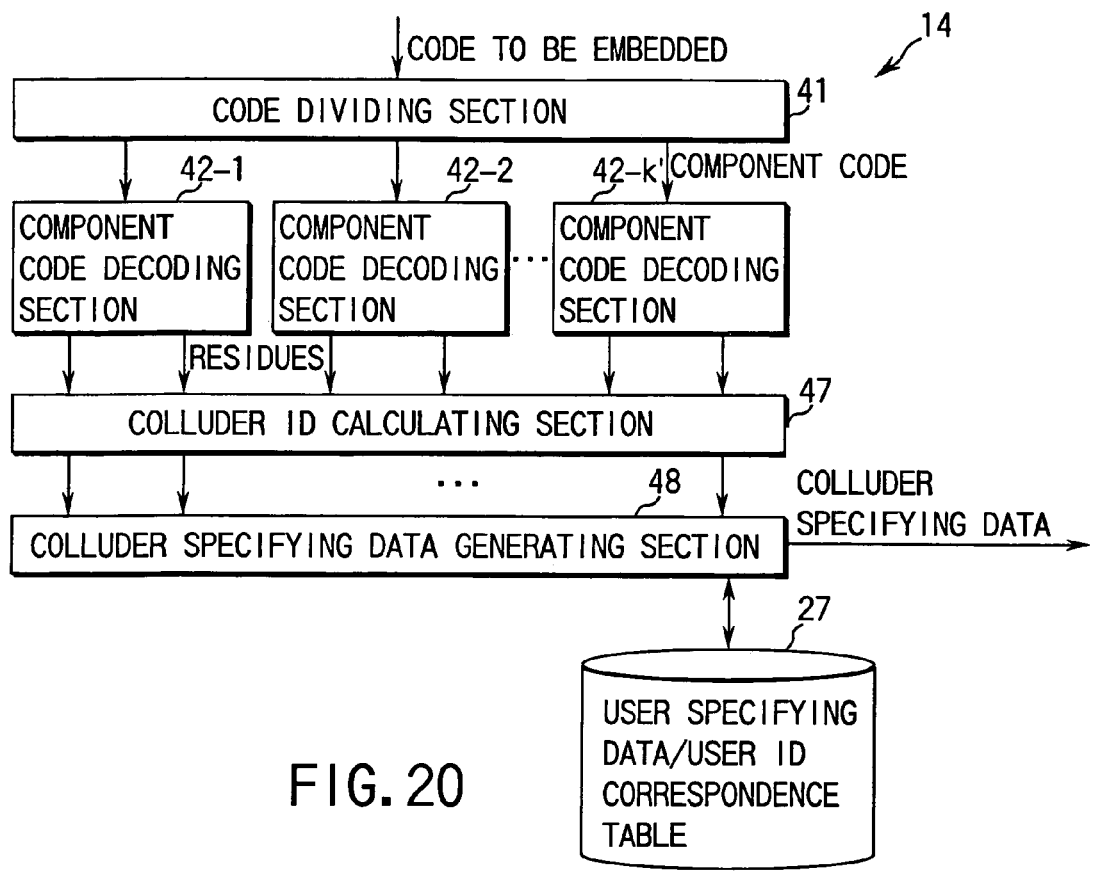
FIG. 20 is a block diagram showing the structure of the code detecting section according to the second embodiment.

FIG. 20 shows the structure of the embedded code detecting section 14 according to the second embodiment. In the present embodiment, the colluder ID calculating section 47 is inputted with k' residue pairs corresponding to a user ID obtained by the component code decoding sections 42-1, 42-2, . . . , 42-k' through the component code division section 41 explained with reference to FIG. 10, like the first embodiment.

A colluder ID calculated by the colluder ID calculating section 47 is inputted to the colluder specifying data generating section 48 which generates colluder specifying data, referring to the user-specifying-data/user-ID correspondence table 27 explained with reference to FIG. 16. The colluder ID calculating section 47 calculates a user ID in the following manner, unlike the colluder ID calculating section 46 shown in FIG. 10.

Figure 21:
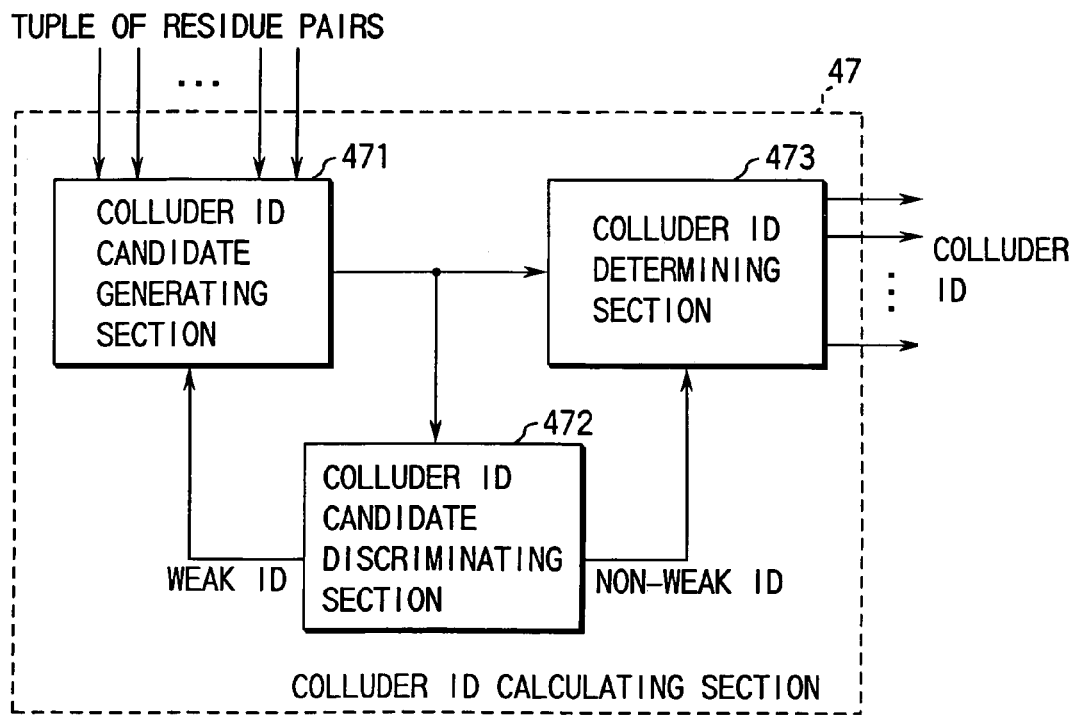
FIG. 21 is a block diagram showing the structure of the colluder ID calculating section in FIG. 20.

As shown in FIG. 21, the colluder ID calculating section 47 is comprised of a colluder ID candidate generating section 471, a colluder ID candidate discriminating section 472, and a colluder ID determining section 473. In the following, the processing procedure in the colluder ID calculating section 47 shown in FIG. 21 will be explained with reference to the flowchart shown in FIG. 22.

First, a process of the colluder ID candidate generating section 471 will now be described.

At first, k'-tuple of residues obtained by the component code decoding sections 42-1, 42-2, ..., 42-$k'$ are inputted (step S41). Next, all the user IDs that have already been used are considered as j (j=0 to n-1), and j=0 is set firstly (step S42). Then, it is determined whether or not the currently set j exceeds a range of the user ID, namely j>n-1 or j≦n-1 (step S43). If j exceeds the range of the user ID, the calculation of the colluder ID is completed.

Figure 22:
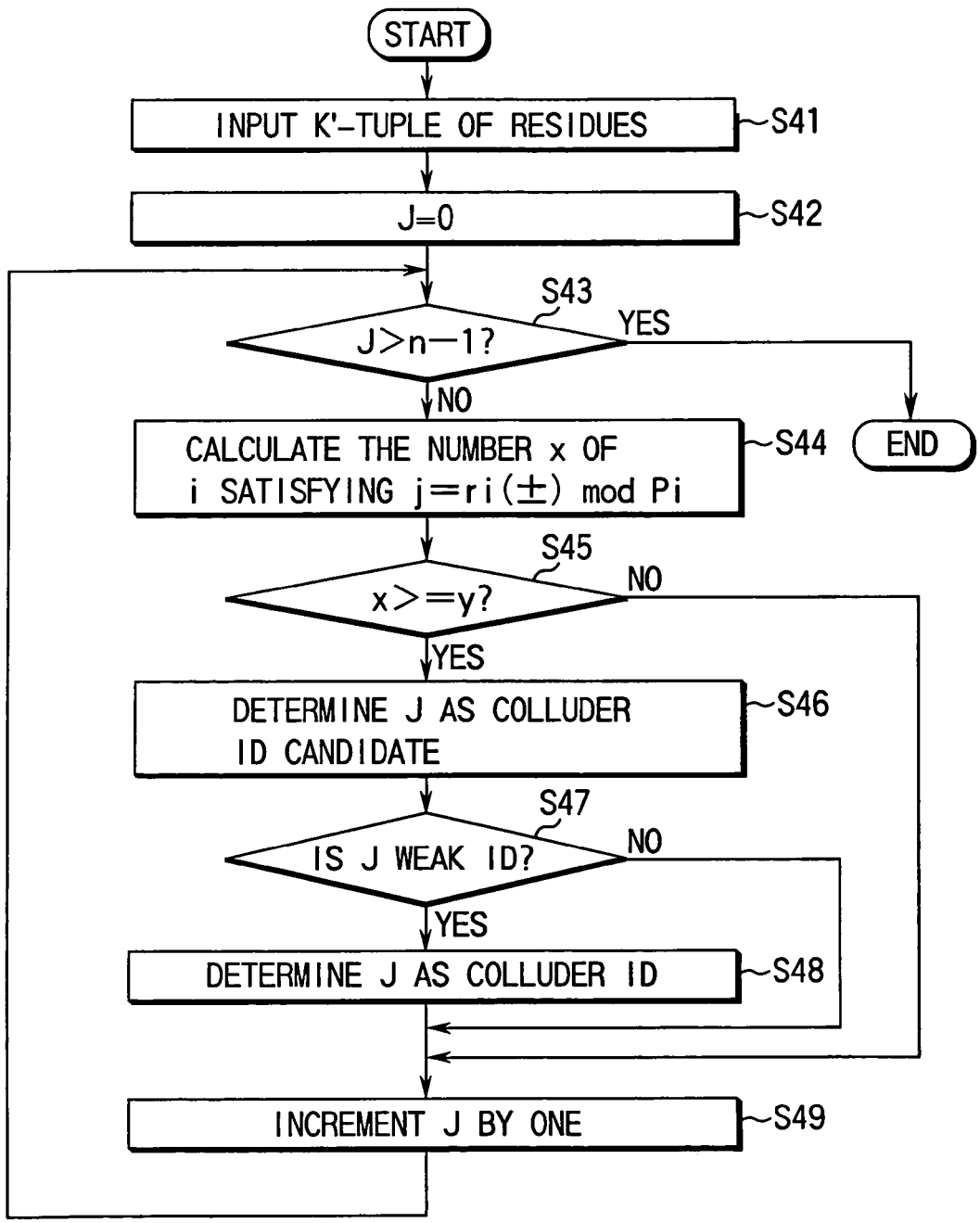
FIG. 22 is a flowchart showing the processing flow in the colluder ID calculating section and the colluder ID candidate generating section in FIG. 21.

On the other hand, if j does not exceed the range of the colluder ID, with respect to a user ID (j), the number x of i that satisfy a congruence j≡$r_i^{(\pm)}$ mod $p_i$ between residues $r_i^{(+)}$ or $r_i^{(-)}$ of all the k' residue pairs inputted in the step S41 shown in FIG. 22 and residues $r_i^{(+)}$ mod $p_i$ or $r_i^{(-)}$ mod $p_i$ taking $p_i$ as modulus is obtained (step S51). The number x will be called the "number of satisfied congruencies". Then, it is checked whether or not the congruence expression satisfying number (x) is a predetermined threshold value y or more (step S45). A larger threshold value y can be set if small detection error is desired, while a smaller threshold value y can be set if larger detection error may be allowed. If it is determined whether or not the colluder ID candidate is the weak ID as described later, the detection error may possibly be ϵ or less even if y is set smaller than k+z. However, if no such determination is made, the detection error cannot be set to ϵ or less unless y is set to k+z or more.

If the congruence expression satisfying number (x) is this threshold value y or more, j is determined as a colluder ID candidate (step S46).

On the other hand, if x is smaller than the threshold value y, the process advances to step S49 to be described later. The colluder ID candidate thus generated is outputted from the colluder ID candidate generating section 471.

A process of the colluder ID candidate discriminating section 472 will now be described.

The colluder ID candidate generated by the colluder ID candidate generating section 471 may possibly be the weak ID and not the authentic colluder ID. Therefore, the colluder ID candidate discriminating section 472 discriminates whether or not the generated colluder ID candidate j is the weak ID (step S47).

The weak ID is a user ID which may be erroneously detected, with a higher possibility, as a colluder ID although it is not actually a colluder ID, as described previously. On the other hand, the user ID which may bee erroneously detected, with a lower possibility, as the colluder ID is called a non-weak ID. A process of the colluder ID determining section 473 will now be described.

If the colluder ID candidate is not the weak ID, namely is the user ID which may erroneously be detected as the colluder ID with a lower possibility, as a result of the discrimination by the colluder ID candidate discriminating section 472 in step S47, the colluder ID discriminating section 473 discriminates the colluder ID candidate as the colluder ID (step S48).

On the other hand, if the colluder ID candidate is the weak ID as a result of the discrimination in step S47, the process advances to step S49.

Figure 18:
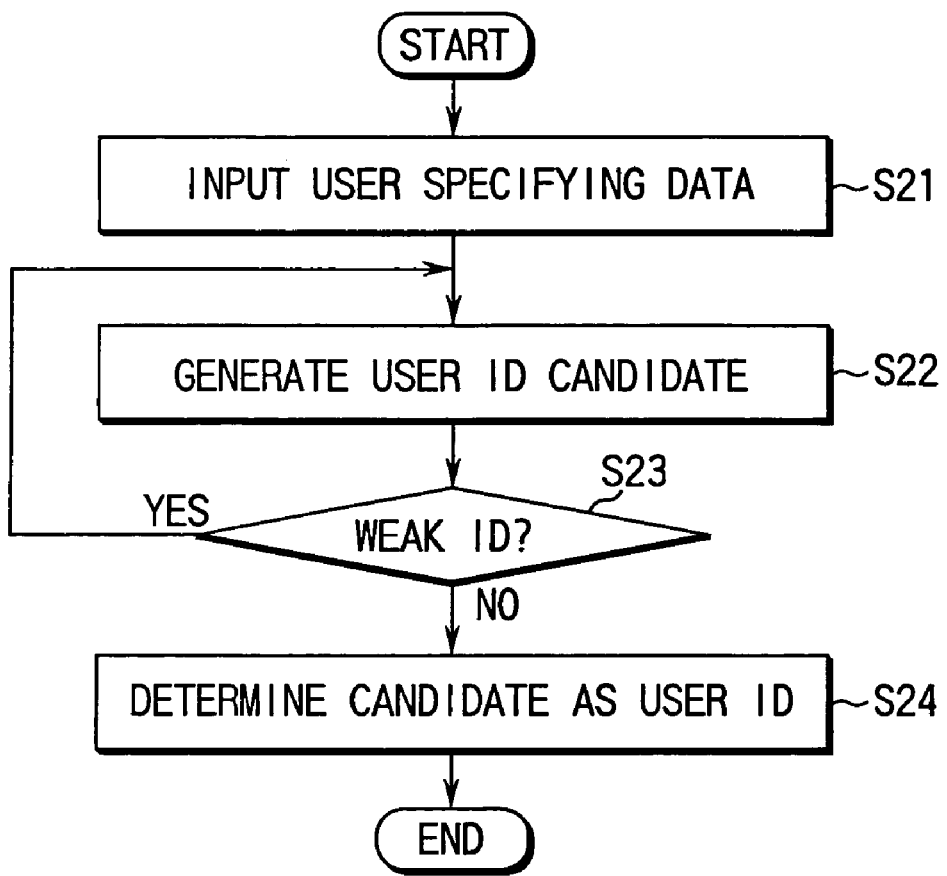
FIG. 18 is a flowchart showing the processing flow in the user ID assigning section in FIG. 17.

The above steps comprises a process to be made with respect to a single value of j. In step S49, since the similar process is made with respect to the next j, j is incremented by one. Thereafter, the process returns to step S43 to repeat the similar process. Accordingly, the colluder ID candidate generating process shown in FIG. 18 is expected with respect to all the user ID and all j satisfying x≧y can be obtained as the colluder ID candidate.

Figure 23:
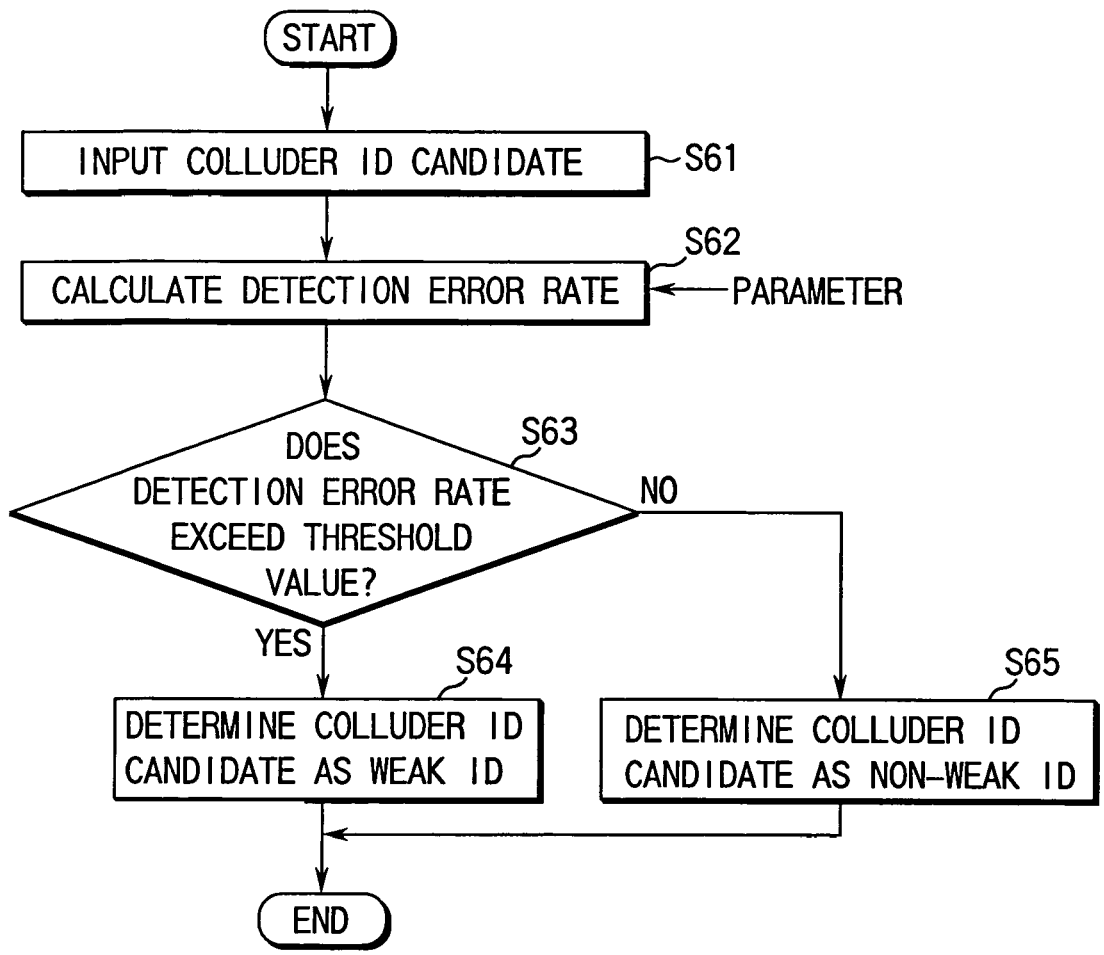
FIG. 23 is a flowchart showing the processing flow in the colluder ID candidate discriminating section in FIG. 21.

Next, explanation will be made of discrimination processing in the step S47 shown in FIG. 22 for determining whether each of the colluder ID candidates generated as described above is a weak ID or non-weak ID, with reference to the flowchart shown in FIG. 23.

Figure 19:
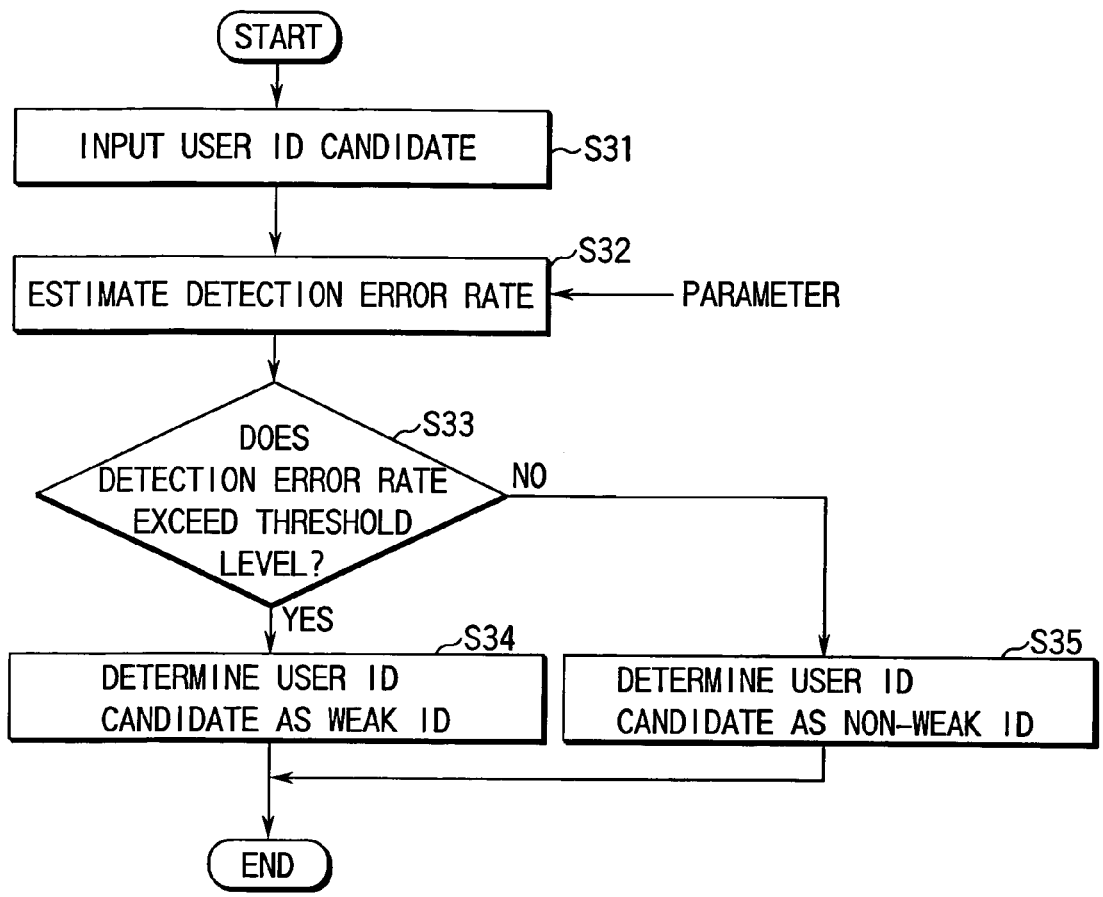
FIG. 19 is a flowchart showing the processing flow in the user ID candidate discriminating section in FIG. 17.

This discrimination processing is basically the same as the discrimination processing shown in FIG. 19 by the user ID candidate discriminating section 26 shown in FIG. 17 in the user ID assigning section 26 in the code concatenating section 11 shown in FIG. 16, except that the user ID candidate as the discrimination target is replaced with the colluder ID candidate.

That is, colluder ID candidates determined in the step S46 in FIG. 22 are sequentially inputted one after another (step S61), and the probability (detection error rate) at which these colluder ID candidates are erroneously detected as colluder IDs is estimated (step S62). Estimation of this detection error rate is carried out, for example, by defining the equations (9) and (10) described previously and by calculating the evaluation value EEP of the equation (11) or (12), as an amount which substantially expresses the probability at which a given user ID(u) is erroneously detected as a colluder ID. Next, whether or not the detection error rate (e.g., the EEP of the equation (11) or (12)) estimated in the step S62 exceeds a predetermined threshold value is checked (step S63). If it exceeds the threshold value, the colluder ID candidate is determined as a weak ID (step S64). Otherwise, if the detection error probability is equal to or less than the threshold value, the colluder ID candidate is determined as a non-weak ID (step S65).

FIG. 24 shows colluder IDs detected with respect to actual colluder IDs, the numbers (x) of satisfied congruencies, and either a correct or incorrect detection result (1 denotes a correct detection and 0 denotes an incorrect detection), in case where parameters are set so as to satisfy L=7.34×$10^6$, c=32, EEF=0.000001, k=2, $p_0$=512, l=11, k'=208, n=2.63×$10^5$.

In case of this example, k+l=13 is given, and therefore, only ID=47824 is detected as a colluder ID among the actual IDs in the first embodiment. In contrast, according to the present embodiment, such an ID that is a non-weak ID and has a relatively large number x of satisfied congruencies is correctly detected as a colluder ID, among the actual colluder IDs. In the example of FIG. 24, for example, if IDs of three or more figures are supposed to be non-weak IDs, those IDS that have a number x of satisfied congruencies of 10 or more among these non-weak IDs are all detected as colluder IDs.

FIG. 25 shows colluder IDs detected with respect to actual colluder IDs, the numbers (x) of satisfied congruencies, and either a correct or incorrect detection result (1 denotes a correct detection and 0 denotes an incorrect detection), in case where the parameters L, EEP, k, p0, l, k', and n are set to the same as those in FIG. 24 except for the parameter c which is set to c=64. Since the colluder number c is twice greater than that of FIG. 24, it is not possible to detect a colluder ID by the manner of the first embodiment. In contrast, in the example of FIG. 25, if non-weak Ids are assumed to be greater than 10,000 and the threshold y is said to be 6, those that have a number x of satisfied congruencies of 6 or more among these non-weak IDs are all detected as colluder IDs.

Thus, according to the present embodiment, the following advantages can be attained.

(1) The number of colluders can be specified with respect to a much larger number c of colluders. In other words, if an equal maximum number of colluders are assumed, it is possible to realize an embedded code having a much shorter code length compared with that of the first embodiment.

(2) A plurality of colluder IDs can be specified.

(3) Colluders can be specified even when noise (e.g., random noise) other than collusion attacks is applied to an embedded code.

The advantages (1) and (2) are just the same as described above. A supplementary explanation as follows will be added to the advantage (3). For example, if random noise is added to an embedded code (watermark information) throughout the entire of a content, a code which outputs an erroneous residue may be generated when decoding a component code. If the error rate caused by this random noise falls within a certain extent, correct residue pairs are overwhelmingly more than incorrect residue pairs. Accordingly, correct colluder ID candidates have a greater number of satisfied congruencies than incorrect colluder ID candidates, so that the detection error rate of colluder IDs is small.

THIRD EMBODIMENT

Figure 26:
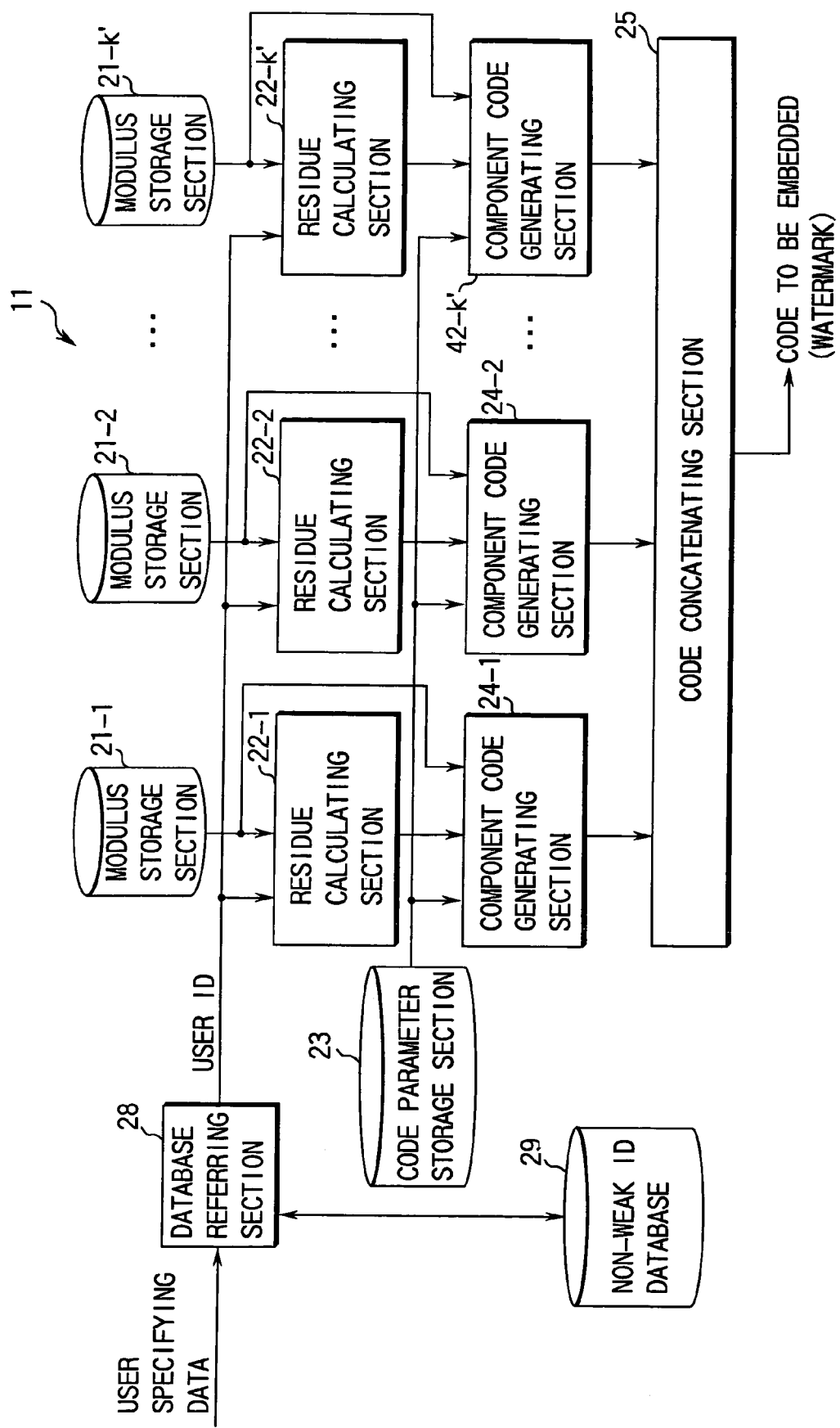
FIG. 26 is a block diagram showing the structure of the code generating section according to the third embodiment of the present invention.

FIG. 26 shows the structure of the code generating section 11 according to the third embodiment of the present invention. In the code generating section 11 according to the present embodiment, the structure shown in FIG. 7 is added with a database referring section 28 and a non-weak ID database 29.

The non-weak ID database 29 stores non-weak IDs among all user ID candidates. The non-weak IDs stored in this non-weak database 29 are obtained in a method similar to the discriminating method in the user ID candidate discriminating section 262 according to the second embodiment, e.g., in a method in which either a weak ID or non-weak ID is discriminated by the algorithm explained with reference to FIG. 19 with respect to all user ID candidates.

When user specifying data is inputted, the database referring section 28 assigns one non-weak ID stored in the non-weak ID database 29, as a user ID, corresponding to the use specifying data, and outputs the non-weak ID (user ID). The residue calculating sections 22-1 to 22-$k'$ the component code generating sections 24-1 to 24-$k'$, and the code concatenating section 25 sequentially perform processing on the user ID, thereby to generate a code to be embedded, like the first and second embodiments.

Information indicating which non-weak ID is assigned to which user specifying data by the database referring section 28 is stored together in the non-weak database 29. That is, with respect to those non-weak IDs that have already been assigned as user IDs to user specifying data among non-weak IDs stored in the non-weak ID database 29, corresponding user specifying data items are stored, maintaining their correspondences to those non-weak IDs. In this manner, those non-weak IDs that have already been assigned to any user specifying data are not assigned to user specifying data items inputted afterward.

Thus, according to the code generating section 11 of the present embodiment, non-weak IDs, i.e., those user IDs that can be erroneously detected as colluder IDs at a high possibility among all user IDs are previously obtained and are stored into the non-weak ID database 29. Referring to the non-weak ID database 29, user IDs are assigned to user specifying data. Therefore, the same assignment of user IDs as that of the second embodiment can be realized in a short time with a less processing amount.

Figure 27:
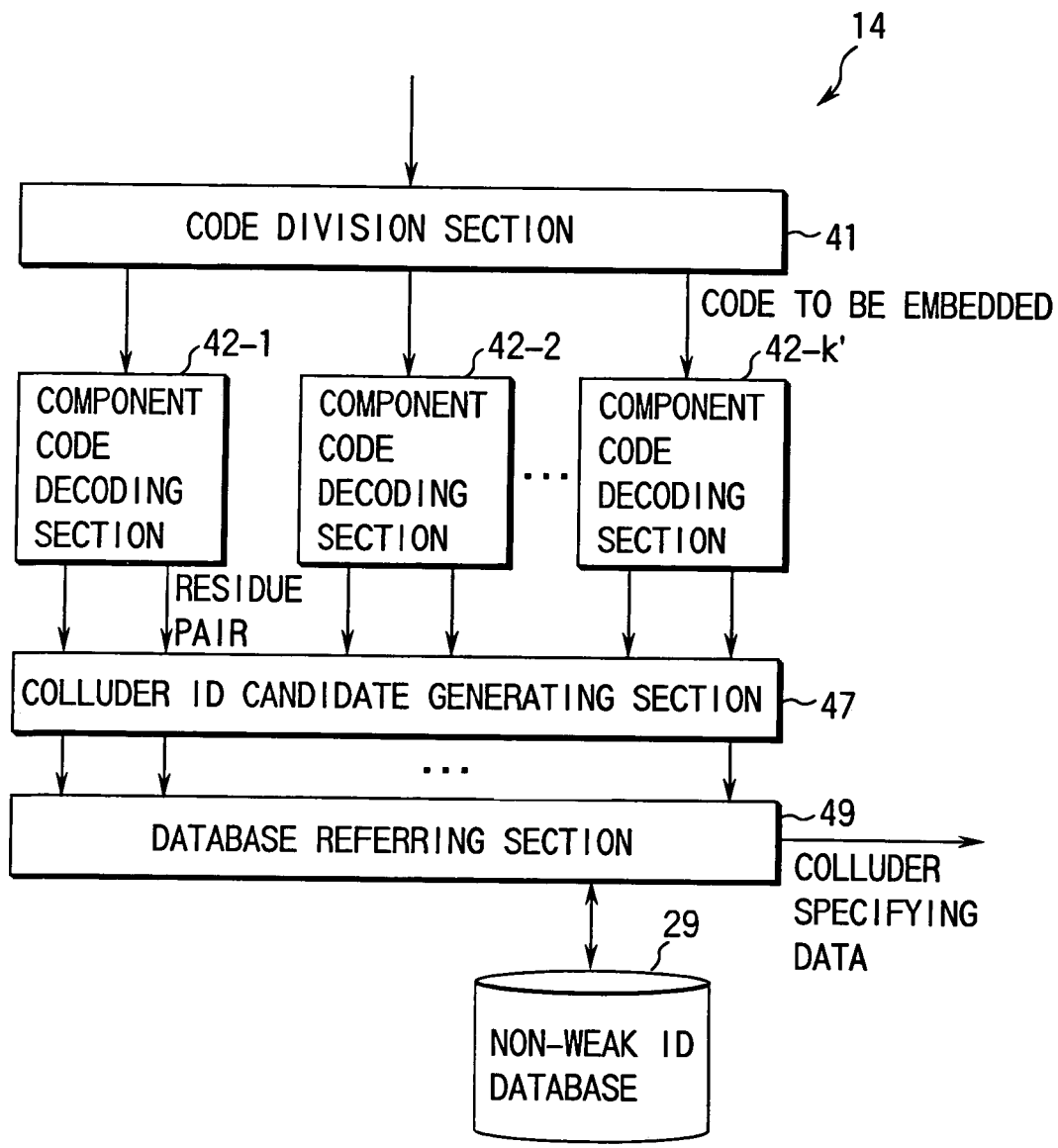
FIG. 27 is a block diagram showing the structure of the code detecting section according to the third embodiment.

FIG. 27 shows the structure of the embedded-code detecting section 14 according to the present embodiment. The embedded-code detecting section 14 according to the present embodiment is added with a not-weak database 29 and a database referring section 49 in place of the user-specifying-data/user-ID correspondence table 27 and the colluder specifying data generating section 48 shown in FIG. 20.

The non-weak database 29 is the same as that explained with reference to FIG. 26. Non-weak IDs and user specifying data items are stored, maintaining correspondences therebetween. When colluder ID candidates are inputted, such a non-weak ID among non-weak IDs stored in the non-weak ID database 29 that corresponds to any of colluder ID candidates is determined as a colluder ID by the database referring section 49. The user specifying data corresponding to the non-weak ID is read from the non-weak ID database 29 and is outputted as colluder specifying data.

According to the embedded-code detecting section 14 of the present embodiment, non-weak IDs, i.e., those user IDs that can be erroneously detected as colluder IDs at a high possibility among all user IDs are previously obtained and are stored into the non-weak ID database 29. Referring to the non-weak ID database 29, a colluder ID is calculated, and user specifying data corresponding to the colluder ID is calculated. Therefore, the same processing of calculating colluder IDs as that of the second embodiment can be realized in a short time with a less processing amount.

In this embodiment, the non-weak ID database 19 is implemented. However, the non-weak ID may be discriminated from the weak ID by using a circuit or a program. Particularly, if the colluder ID is known and the colluder can be specified by means other than the present invention, it is necessary only to exclude the weak IDs.

FOURTH EMBODIMENT

Next, explanation will be made of a watermark embedding unit and a watermark detecting unit, as the fourth embodiment, based on a c-secure code having a shorter code length than that of the second embodiment, which can be realized under a certain condition.

Figure 28:
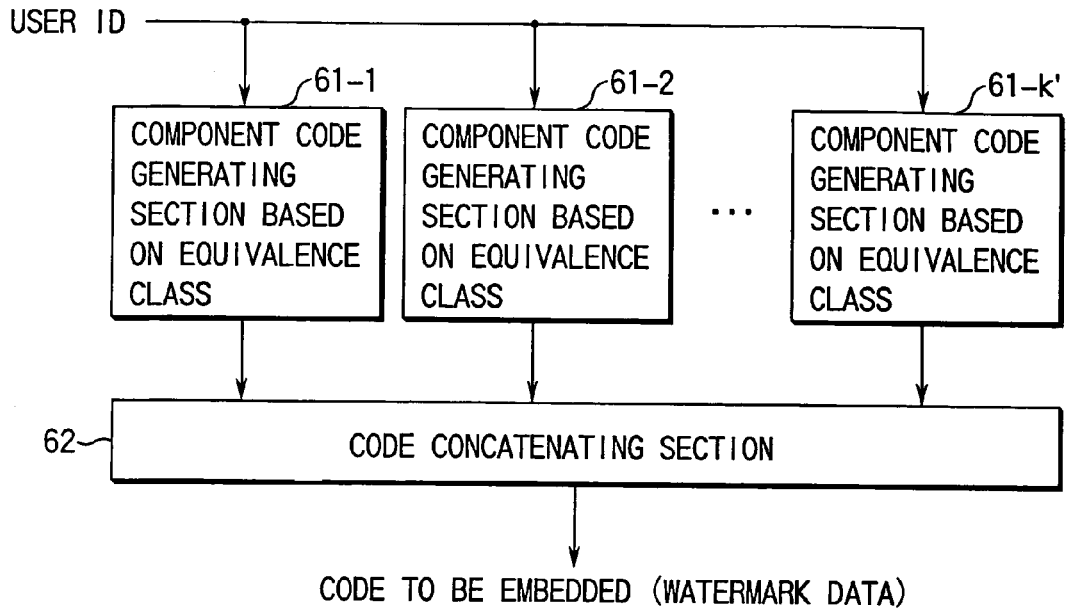
FIG. 28 is a block diagram showing the structure of the code generating section according to the fourth embodiment of the present invention.

FIG. 28 is a block diagram showing the structure of the code generating section according to the present embodiment. The code generating section is comprised of component code generating sections 61-1, 61-2, . . . , 61-$k'$ which are inputted with a user ID and generate component codes based on an equivalence class, and a code concatenating section 62 for concatenating those component codes into one code thereby to generate a code as watermark data to be embedded.

Figure 29:
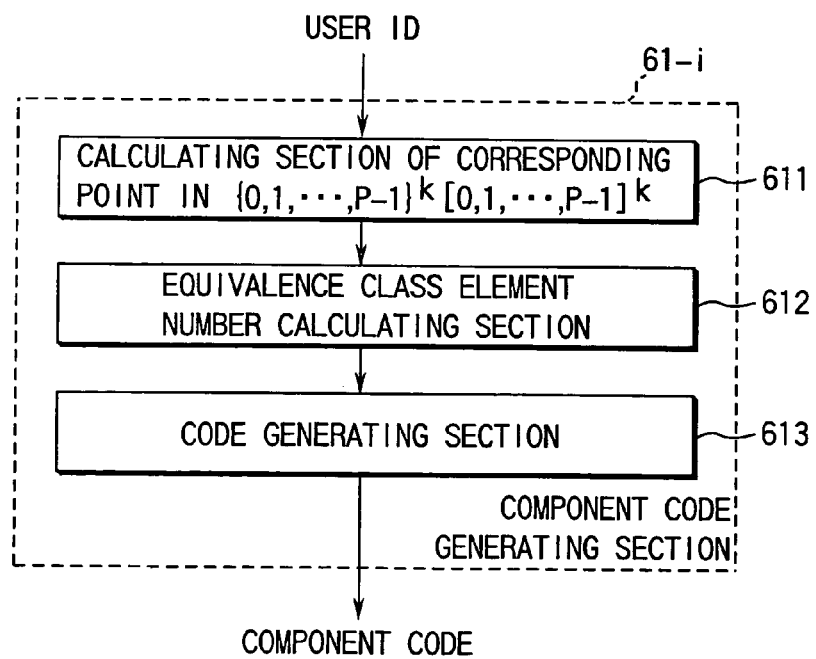
FIG. 29 is a block diagram showing the structure of the component code generating section based on equivalence class in FIG. 28.

FIG. 29 shows the structure of one section 61-$i$ among the component code generating sections 61-1, 61-2, . . . , 61-$k'$. In the following, $Z/pZ=\{0, 1, 2, \ldots, p-1\}$ is given. The component code generating sections 61-$i$ is constructed by an inside-$(Z/pZ)^k$ corresponding point calculating section 611, an equivalence class element number calculating section 612, and a component code generating section 613.

The inside-$(Z/pZ)^k$ corresponding point calculating section 611 is inputted with a user ID and outputs a corresponding point within $(Z/pZ)^k$. Correspondence between a user ID(u) and a point $(u_0, u_1, u_2, \ldots, u_{p-1})$ within $(Z/pZ)^k$ is given, for example, by $u=u_0+u_1p+ \ldots +u_{k-1}p^{k-1}$. If there is an equivalence relationship R between factors of a set U, a set of all factors each of which is equivalent to a given factor u is called an equivalent class of the factor u. A set of entire equivalence classes related to the equivalence relationship R of the set U is expressed as U/R and is called a equivalence class of U related to R. By a parallel transformation T between the factors of $(Z/pZ)^k$, the equivalence relationship $R_T$ can be defined. Further, a equivalence class related to this equivalence relationship $R_T$ can be defined.

Numbers from 0 to $p^{k-1}$ (which are called equivalence class element numbers) can be assigned to elements which belong to one same equivalence class. The equivalence class element number calculating section 612 calculates the equivalence class element number and output it as a component ID. That is, in the present embodiment, the equivalence class element number calculating section 612 calculates the equivalence class element numbers, as a set of integral elements with respect to an inputted user ID. The component code generating section 613 generates a component code from the component ID calculated by the equivalence class element number calculating section 612.

Figure 30:
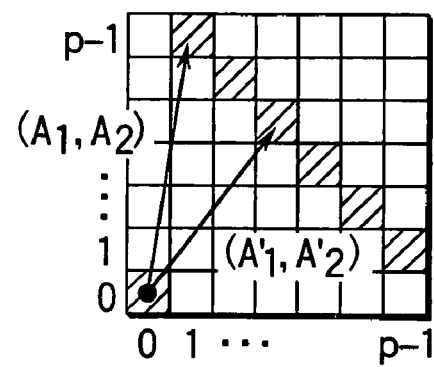
FIG. 30 is a view showing that a set of quotients can be defined by equivalence class based on parallel transformation, according to the fourth embodiment.

FIG. 30 is a view showing an example of an equivalence class based on parallel transformation. This figure shows an example where p=7 and k=2 are given. It is apparent that the parallel transformations (1,6) and (3,4) define one same equivalence class constructed by grid parts indicated by oblique lines.

Figure 31:
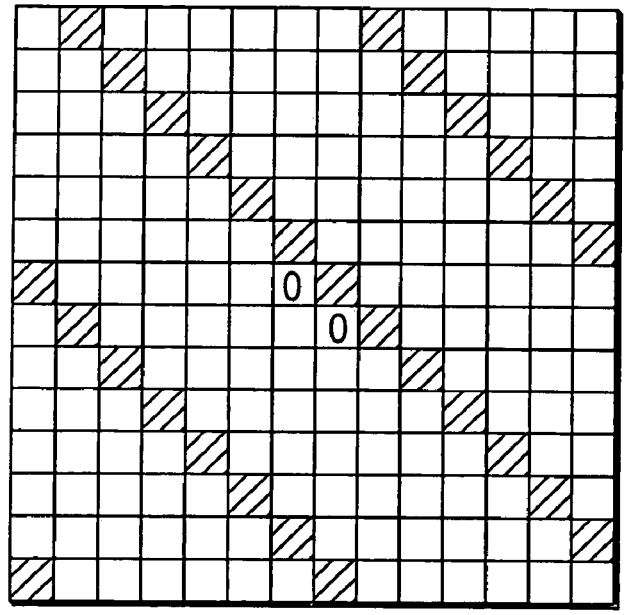
FIG. 31 is a view showing an example of equivalence class based on parallel transformation according to the fourth embodiment.
Figure 32:
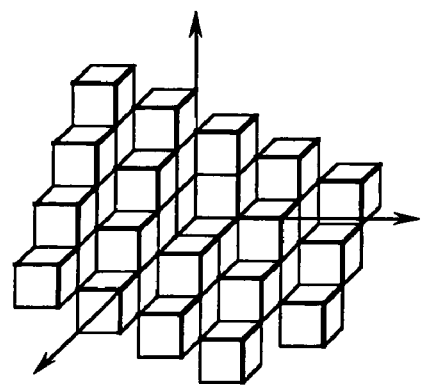
FIG. 32 is a view showing an example of equivalence class where k=3 is given, according to the fourth embodiment.

FIG. 31 is a view showing how an equivalence class is expressed when the grid of p×p shown in FIG. 30 is repeated cyclically. Such an equivalence class that is defined by an equivalence relationship based on parallel transformation and includes a grid part (0,0) can be found to be on a line having a certain inclination. FIG. 32 is a view showing an example where FIG. 30 is expanded to k=3. In a similar manner, an equivalence class can be defined by an equivalence relationship based on parallel transformation with respect to an arbitrary positive integer k.

The number of elements contained in one equivalence class is p. The order numbers (equivalence class element numbers) are given to the p elements.

Meanwhile, the number of elements of a set of quotients (=the number of equivalence classes) is $p^k/p=p^{k-1}$. Therefore, if an order number is specified, $p^{k-1}$ elements are specified. This order number is coded as a component ID by means of a component code.

Assigning method of assigning equivalence class element numbers (component IDs) in the equivalence class number calculating section 612 will now be explained below. The following two methods are considered as assigning methods.

(Assigning Method 1)

This method uses equivalence class numbers as numbers that are assigned to equivalence classes relating to an equivalence relationship $R_A$. Numbers from 0 to $p^{k-1}$ are assigned.

(Assigning Method 2)

This method uses numbers assigned to elements of an equivalence class. Numbers from 0 to p−1 are assigned.

Of the above two methods, the assigning method 2 is more preferable. If the assigning method 2 is adopted, the same discussion as made on the second embodiment can be developed, and therefore, the equation (6) described previously is given. That is, it is only necessary to adopt a code that satisfies both the equation (2) and equation (22) to be described later. An example of this assigning method 2 will be cited below. In case of an equivalence class based on the parallel transformation $A_i=(a_{i,0}, a_{i,1}, \ldots, a_{i,k-1})$, the next equation is assigned as a equivalence class element number (component ID) to $u=(u_0, \ldots, u_{k-1})$ $$\sum_{j=0}^{k-1} u_j a_{i,j} \bmod p \tag{15}$$

Figure 33:
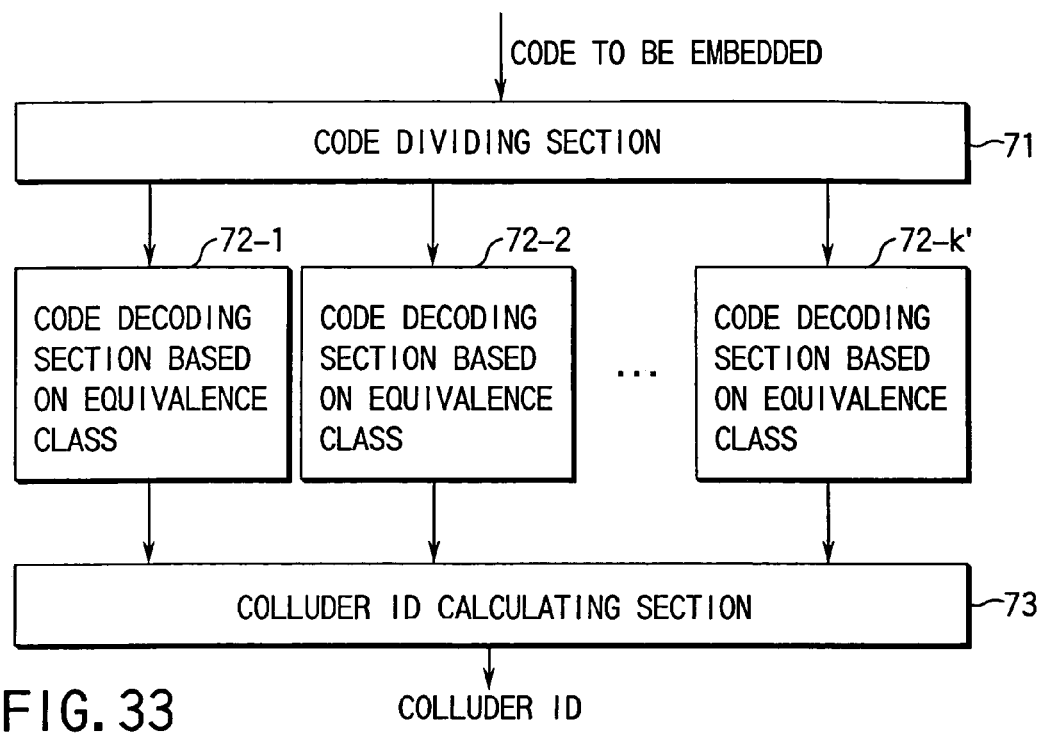
FIG. 33 is a block diagram showing the structure of the code detecting section according to the fourth embodiment.

FIG. 33 shows the structure of the code detection section in the watermark detecting unit according to the present embodiment. This code detecting section is comprised of a code division section 71, component code decoding sections 72-1, 72-2, ..., 72-$k'$, and a colluder ID calculating section 73.

By an embedded-code extracting section not shown, watermark information (code to be embedded) is extracted from an inputted content (code-embedded content) as a detection target. The code to be embedded, as the extracted watermark information, is divided into component codes by the code division section 71. Thereafter, the component codes are decoded by the component code decoding sections 72-1, 72-2, ..., 72-$k'$ based on equivalence class, thereby generating pairs of equivalence class element numbers corresponding to a user ID. From each pair of equivalence class element numbers thus generated, a colluder ID is calculated by the colluder ID calculating section 73, so that colluders are specified.

Like the first and second embodiments, the structure may be arranged as follows. A user ID is obtained from one of each pair of equivalence class element numbers by the user ID calculating section. From each pair of equivalence class element numbers, presence or absence of a collusion is determined. With respect to results of the collusion discriminating section, a logical sum is obtained by the collusion discriminating OR section. Whether or not a collusion has existed is determined finally. If it is determined that a collusion exists, the colluder ID calculating section 73 calculates a colluder ID.

Figure 34:
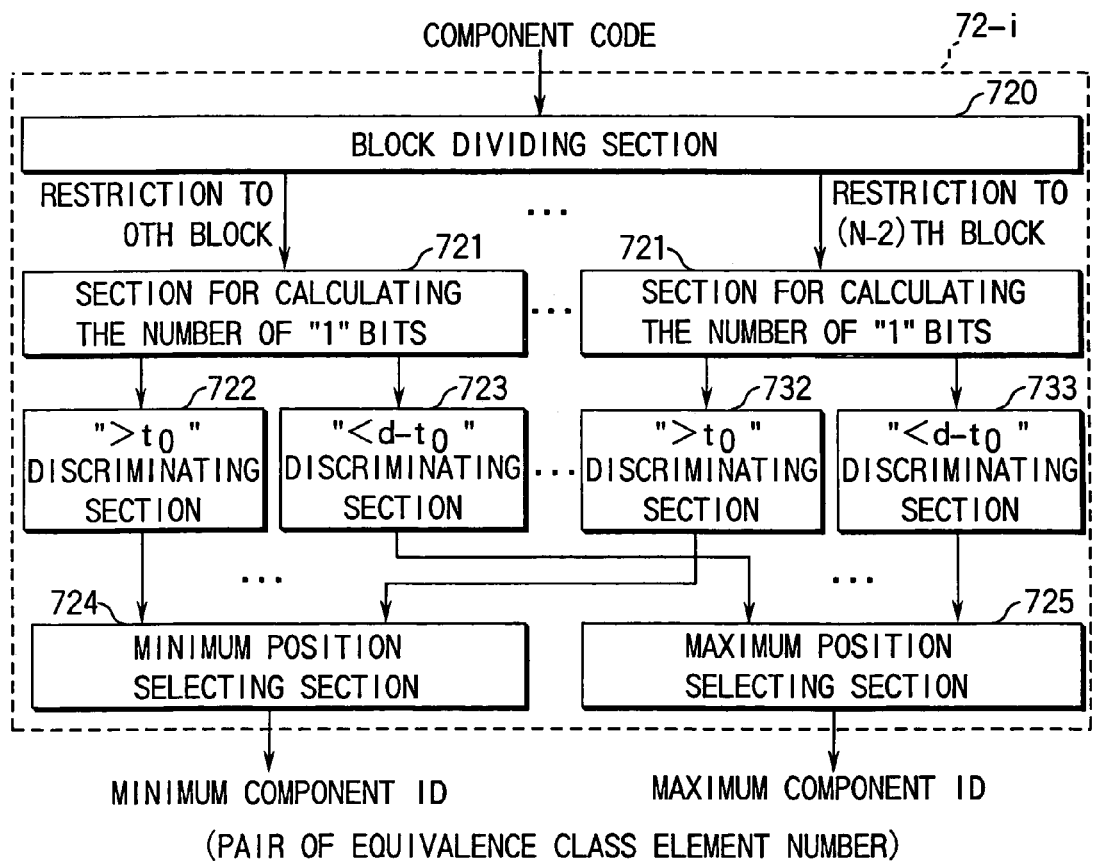
FIG. 34 is a block diagram showing the structure of the component code generating section based on equivalence class in FIG. 33.

FIG. 34 shows the structure of one section (72-$i$) of the component code generating sections 72-1, 72-2, ..., 72-$k'$. The component code decoding section 72-$i$ based on equivalence class is based on the detection algorithm 3 which permits a random error described later. The component code generating sections 72-1 is comprised of a block division section 720, "1"-bit calculating sections 721, ">$t_0$"-discriminating sections 722, "d-$t_0$"-discriminating sections 723, a minimum position selecting section 724, and a maximum position selecting section 725.

The block division section 720 divides an inputted component code into restricted blocks and outputs division results to the "1"-bit calculating sections 721, respectively. One "1"-bit calculating section 721 calculates the number of bits expressing "1" and outputs the calculated value to both of the ">$t_0$"-discriminating section 722 and the "d-$t_0$"-discriminating section 723.

The ">$t_0$"-discriminating section 722 determines whether or not the input is greater than a first threshold value $t_0$. The section 722 outputs 1 if true or 0 if false. The "d-$t_0$"-discriminating section 723 determines whether or not the input is smaller than a second threshold value d-$t_0$. The section 723 outputs 1 if true or 0 if false.

The minimum position selecting section 724 outputs the minimum bit number which expresses 1, among a set of bits inputted from the ">$t_0$"-discriminating section 722. The maximum position selecting section 725 outputs the maximum bit number of bits expressing 1, among a set of bits inputted from the "d-$t_0$"-discriminating section 723.

Explained now will be a case where there is a possibility of occurrence of an error in the watermark detecting unit when decoding watermark information as an embedded code. If there is an error when decoding an embedded code, an user may be erroneously specified as a colluder. To prevent this error, there are two methods.

(Method 1)

In the watermark embedding unit, a code to be embedded is embedded after to error correction coding is performed on the code to be embedded. Further, error correction decoding is performed on a detected code in the watermark detecting unit.

(Method 2)

The component code generating sections 72-1, 72-2, . . . , 72-$k'$ are let have a characteristic of permitting an error.

The present embodiment adopts the method 2. Suppose that extracted codes to be embedded are added with errors at random probabilities. Errors are permitted by using the detection algorithm 3 which is obtained by modifying the algorithm 1 described previously in the section embodiment.

(Detection Algorithm 3)
(1) Input a detected code $x \in \{0,1\}^l$. Suppose now that l=(n−1)d is given.
(2) Execute the following from s=0 to n−2.
(2-1) Stop if weight($x|_{B_s}$)>$t_0$ is satisfied.
(3) Execute the following from t=n−1 to s.
(3-1) Interrupt if weight($x|B_{t-1}$)<d−$t_0$ is satisfied.
(4) Output s and t.

In this algorithm, $t_0$ is a parameter indicating permissiveness of the detection algorithm with respect to an error.

Explained next will be the meaning of adding a new parameter as a threshold value for determining that an alteration has been made on an embedded code by a collusion.

If a random error occurs due to any other reason than collusions with respect to such a block among embedded codes that has not been altered by a collusion, the probability at which inversion of $t_0$+1 bits or more occurs can be obtained by the next equation.

$$\varepsilon_1 = \sum_{i=t_0+1}^{d} {}_dC_i(1-\varepsilon_0)^{d-i}\varepsilon_0^i < e^{-\frac{(t_0-d\varepsilon_0)^2}{d}} \quad (16)$$

Meanwhile, if a random error is added additively, due to a reason other than collusions, to a block which has been altered by a collusion, the probability at which inversion of t0 bits or less is smaller than the next equation.

$$\varepsilon_2 = \sum_{i=0}^{t_0} {}_dC_i(1/2)^d < e^{-\frac{(\frac{d}{2}-t_0)^2}{d}} \quad (17)$$

The probability at which an embedded code is erroneously detected due to a random error is at least equal to or smaller than the probability at which an erroneous detection is made in one block.

This probability is expressed by the following.

$$\epsilon_3 = 1-(1-\epsilon_1)^{n-1}(1-\epsilon_2)^2 < (n-1)\epsilon_1 + 2\epsilon_2.$$

Figure 35:
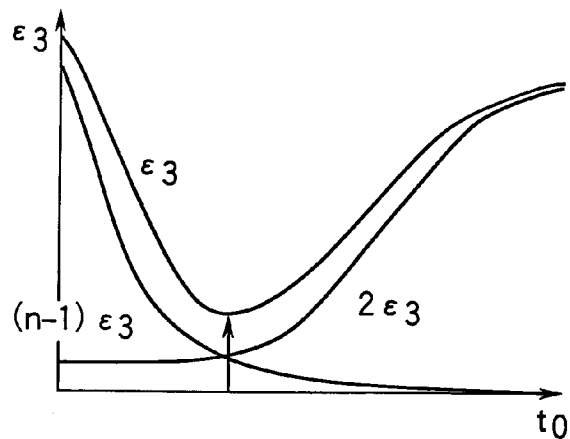
FIG. 35 is a graph explaining the component code generating section based on equivalence class shown in FIG. 34.

By appropriately selecting $t_0$ as shown in FIG. 35, the detection error can be set to be small even if a random error is added additively.

The component code decoding section 72-$i$ shown in FIG. 34 performs processing based on the detection algorithm 3 which prevents a random errors as described above.

Figure 36:
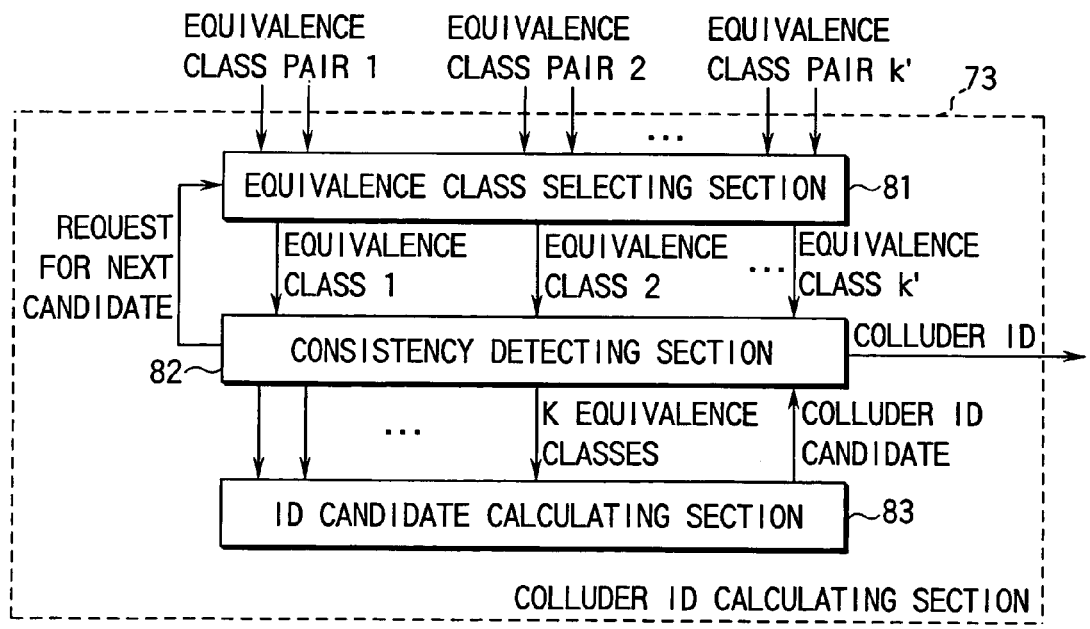
FIG. 36 is a block diagram showing the structure of the colluder ID calculating section in FIG. 33.

FIG. 36 shows the structure of the colluder ID calculating section 74. The colluder ID calculating section 74 is comprised of an equivalence class selecting section 81, a consistency detecting section 82, and a candidate ID calculating section 83.

The equivalence class element selecting section 81 selects one from each of k' pairs of equivalence class element numbers and outputs it to the consistency detecting section 82. When the section 81 receives a request for a next candidate from the consistency detecting section 82, the section 81 selects a new set of equivalence class element numbers.

The consistency detecting section 82 selects a set of (k+l) elements from a set of k' elements and checks whether or not the set of equivalence class element numbers is truly consistent. This check is carried out by supplying the candidate ID calculating section 83 with k equivalence class element numbers among (k+l) numbers and by determining whether or not a returned candidate ID contradicts to the remaining equivalence class element numbers. If a contradiction is determined with respect to none of all the remaining equivalence class numbers, this candidate ID is outputted as a colluder ID. Otherwise, a next candidate is requested to the consistency detecting section 82.

Explanation will now be made of a method for reconstructing a colluder ID from k equivalence class element numbers in the candidate ID calculating section 83 shown in FIG. 36. For example, if equivalence class element numbers of $r_0$, . . . , $r_{k-1}$, are given to k parallel transformations $A_{i(0)}$, . . . , $A_i(k-1)$, the following simultaneous congruent equation exists.

$$\sum_{j=0}^{k-1} u_j a_{i(v),j} \equiv r_v \bmod p \quad (18)$$

If a k-dimensional square matrix ($a_{i(v),j}$) is regular, an inverse matrix ($a^{-1}_{j,i(v)}$) exists. In this case, a user ID is obtained by the next equation.

$$u_j \equiv \sum_{v=0}^{k-1} a^{-1}_{j,i(v)} r_v \bmod p \quad (19)$$

In general, the regularity is not always satisfied. If the regularity is not satisfied, a user ID cannot be determined uniquely but a set of user IDs that include a concluder ID is obtained. This set has a size of a power of p. Since sets of component codes that do not satisfy the regularity are previously known, they may be arranged so as not to be selected for calculations of candidates of colluder IDs.

The consistency detecting section 82 in FIG. 36 verifies the consistency between the colluder ID candidates (i.e., a set including the colluder ID candidates) thus obtained and another equivalence class element number $r_k$, . . . , $r_{k+l-1}$. This is achieved by confirming that the next equation is satisfied with respect to v=0, . . . , l−1.

$$\sum_{j=0}^{k-1} u_j a_{i(k+v),j} \equiv r_{k+v} \bmod p \qquad (20)$$

According to the present embodiment, it is possible to attain resistance to collusion attacks, like the fist and second embodiments. Also, it is possible to generate a sufficient and proper code to be embedded, based on evaluation of a correct error rate, and to decode correctly the code, even if three or more colluders participate in a collusion attack. Explanation thereof will be in more details below.

At first, suppose that p is a positive integer. That is, in the present embodiment, the number (of integral elements calculated with respect to a predetermined number n of user IDs) equivalent to $P_i$ (i=1, 2, . . . , k') (values of residues calculated with respect to a predetermined number n of user IDs) in the second embodiment is set to the same positive integer p. Further, a user IDu is expressed by $(u_0, u_1, \ldots, u_{k-1}) \in (Z/pZ)^k$ in accordance with $u = u_0 + u_1 p + \ldots u_{k-1} p^{k-1}$. Also, k'=c(k+l)/2 and $p^k \geq n$ are set.

The equivalence relationship $R_A$ relating to parallel transformation $A \equiv (a_0, a_1, \ldots, a_{k-1})$ of the space $(Z/PZ)^k$ is defined as follows.

$RA((u_0, u_1, \ldots, u_{k-1}), ((u_0', u_1', \ldots, u_{k-1}')) \leftarrow \rightarrow u_0' \equiv u_0 + a_0$ mod p $u_1' \equiv u_1 + a_1$ mod p . . . , $u_{k-1}' \equiv u_{k-1} + a_{k-1}$ mod p Where $jA = (ja_0 \bmod p, ja_1 \bmod p, \ldots, j a_{k-1} \bmod p)$ is given, $R_A$ and $R_{jA}$ constitute an equivalence relationship if j satisfies gcd(j,p)=1.

The set of the entire users can be defined by a set of quotients $U/R_A$ relating to an equivalence relationship $R_A$ of $U = (Z/pZ)^k$. Individual elements of this set of quotients are called an equivalence class and are a set of elements that are identified with each other. By providing elements contained in all equivalence classes with order numbers, one element can be selected from each equivalence class by specifying a certain number.

If k' (k≧k) parallel transformations $A_0, \ldots, A_{k'-1}$ are prepared, quotient sets $Q_i = U/R_{Ai}$ (i=0, . . . , k'-1) are defined respectively for the parallel transformations. The order numbers as described above are respectively defined for the quotient sets.

Next, the following conditions are supposed in order to construct a quotient set which can uniquely specify a user by specifying order numbers respectively for arbitrary k quotient sets among the k' quotient sets.

(Condition 1)

Suppose that the quotient sets have an equal size. Suppose that gcd($a_{i,m}$,p)=1 or $a_{i,m}$=0 are satisfied with respect to all $a_{i,m}$ (m=0, . . . , k-1) In all $A_i = (a_{i,0}, \ldots, a_{i,k-1})$ (i=0, . . . , k'-1). Hence, the minimum positive integer j which satisfies $jA_i$=(0 mod p, . . . , 0 mod p) is p.

(Condition 2)

There exists no positive integer j<p,j'<p which satisfies $jA_i = j'A_{i'}$ with respect to two parallel transformations $A_i, A_{i'}$.

If p is a prime number, the number of parallel transformations that satisfies the conditions described above can be counted as follows.

At first, the number of cases that the value of the component of each parallel transformation and p are prime to each other is expressed by $\phi(p) = p-1$ from the condition 1. Here, $\phi$ is an Euler function. A case of 0 is added thereto. Then, the number of cases of values which each component can take is p. Accordingly, the number of cases that are permitted as parallel transformations is $(p^k-1)$. In this equation, -1 is added because (0, 0, . . . , 0) is excluded. Among them, however, each value has those (p-1) values that are integral multiples (1 time, 2 times, . . . , (p-1) times) of itself. Therefore, $(p^k-1)/(p-1)$ is the number of those parallel transformations that are independent as parallel transformations which respectively define different quotient sets.

With respect to the condition 2, suppose that given two parallel transformations $A_i, A_i'$ do not the limitations of the condition 2. That is, suppose that $jA_i = j'A_i'$ is satisfied with respect to the positive integer j<p, j'<p. If p are prime numbers, it means that they can be expressed as multiples of each other.

Accordingly, the counted independent parallel transformations with respect to the condition 1 directly satisfy the condition 2.

The sets of parallel transformations can be constructed as follows.

$$A_1 = (0, 0, \ldots, 0, 1), \qquad (21)$$
$$A_2 = (0, 0, \ldots, 0, 1, 0),$$
$$\vdots$$
$$A_{1+p} = (0, 0, \ldots, 0, 1, p-1),$$
$$A_{1+p+1} = (0, 0, \ldots, 0, 1, 0, 0),$$
$$\vdots$$
$$A_{1+p+p^2} = (0, 0, \ldots, 0, 1, p-1, p-1),$$
$$\vdots$$
$$A_{1+p+p^2+\ldots+p^{k-2}+1} = (1, 0, \ldots, 0),$$
$$\vdots$$
$$A_{1+p+p^2+\ldots+p^{k-1}} = (1, p-1, \ldots, p-1).$$

With respect to the case where p is not a prime number, the same construction as above can be achieved by selecting parallel transformations so as to satisfy the conditions 1 and 2.

By constructing quotient sets by parallel transformations as described above and by defining order numbers for elements of equivalence class of each quotient set, it is possible to construct a code similar to that of the case of the code based on the Chinese remainder theorem. In order that this code is a c-secure code with ε-error, the following condition must be satisfied in addition to the theorem 2.

$$k' = \frac{c}{2}(k+l) \leq \frac{p^k - 1}{p - 1} \qquad (22)$$

In this case, all factors are p having an equal size. Therefore, $p_{ave}$=P is given.

Thus, according to the present embodiment, codes that are defined by parallel transformations as indicated by the equation (21) are generated as component codes. The component codes are concatenated thereby to generate a code to be embedded, which is based on a c-secure code having a shorter code length than those of the first and second embodiments. In case of detecting the embedded code, the condition of the equation (22) is further satisfied in addition to the condition equation k'≧c(k+l)/q defined in the second embodiment and the condition of the equation (8). In this manner, resistance to collusion attacks can be maintained. In addition, even if three or more colluders participate in a alteration, a sufficient and proper code to be embedded can be generated, based on correct evaluation of a error rate, and the embedded code can be correctly decoded.

FIFTH EMBODIMENT

Next explanation will be made of a watermark embedding unit and a watermark detecting unit, as the fifth embodiment of the present invention, in which more proper coding is carried out than in conventional units so that influences on the quality of code-embedded contents are reduced.

Figure 37:
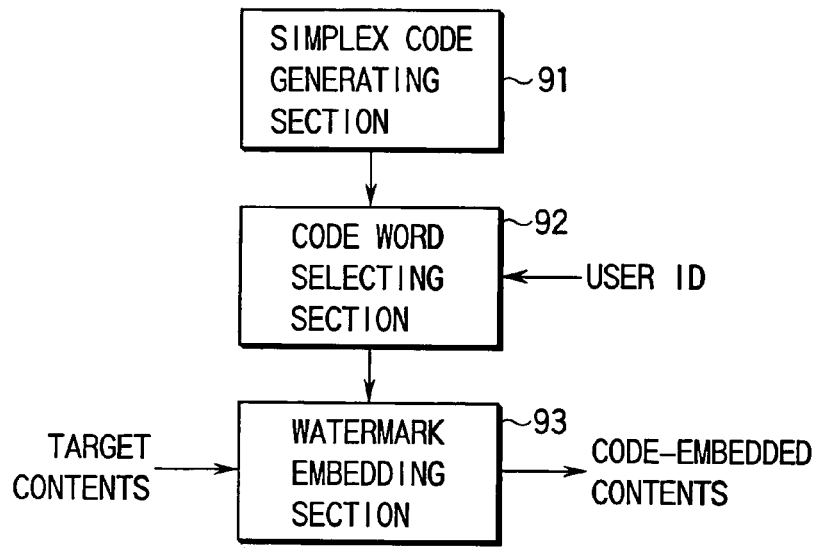
FIG. 37 is a block diagram showing the structure of the watermark embedding unit according to the fifth embodiment of the present invention.

FIG. 37 shows the structure of the watermark embedding unit according to the present embodiment. This watermark embedding unit is comprised of a simplex code generating section 91, a codeword selecting section 92, and a watermark embedding section 93.

Figure 38:
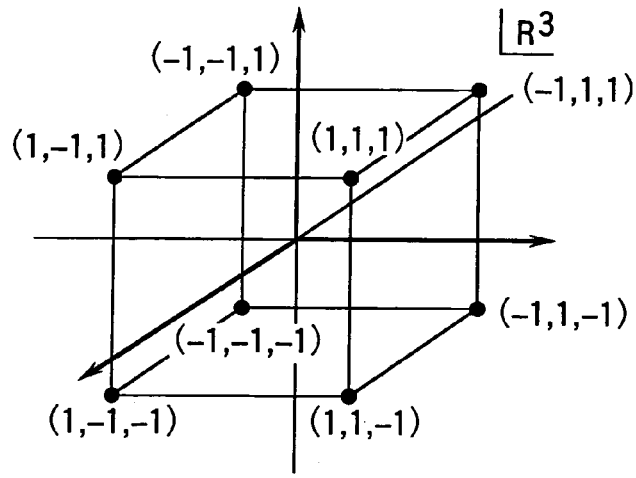
FIG. 38 is a view explaining a simplex code used in the fifth to sixth embodiments of the present invention.

The simplex code is a code which has a cross-correlation of $-1/(n-1)$ between codewords where the code length is $n-1$ and the number of codewords is n. This code can be constructed on the basis of a n-dimensional Hadamard matrix. That is, a simplex code is a code having such codewords that are positioned at vertexes of (n−1)-dimensional units in a (n−1)-dimensional Euclidian space. For example, in case of a three-dimensional Euclidian space, codes positioned at vertexes expressed by $(-1, -1, 1)$, $(1,-1,-1)$, and $(-1,1,-1)$ as shown in FIG. 38 construct a simplex code.

The simplex code generating section 91 generates codewords of this kind of simplex code. The simplex code generating section 91 may be a storage which contains previously generated codewords. The codeword selecting section 92 assigns order numbers to generated simplex codes and selects and outputs codewords corresponding to a given user ID. The parts of the simplex code generating section 91 and the codeword selecting section 92 may be arranged such that, after a user ID is inputted, codewords of a simplex code corresponding the user ID are generated and outputted.

The watermark embedding section 93 embeds codewords received from the codeword selecting part 92, as watermark information, into a content as an embedding target. Embedding is carried out on the basis of the spread spectrum.

Figure 39:
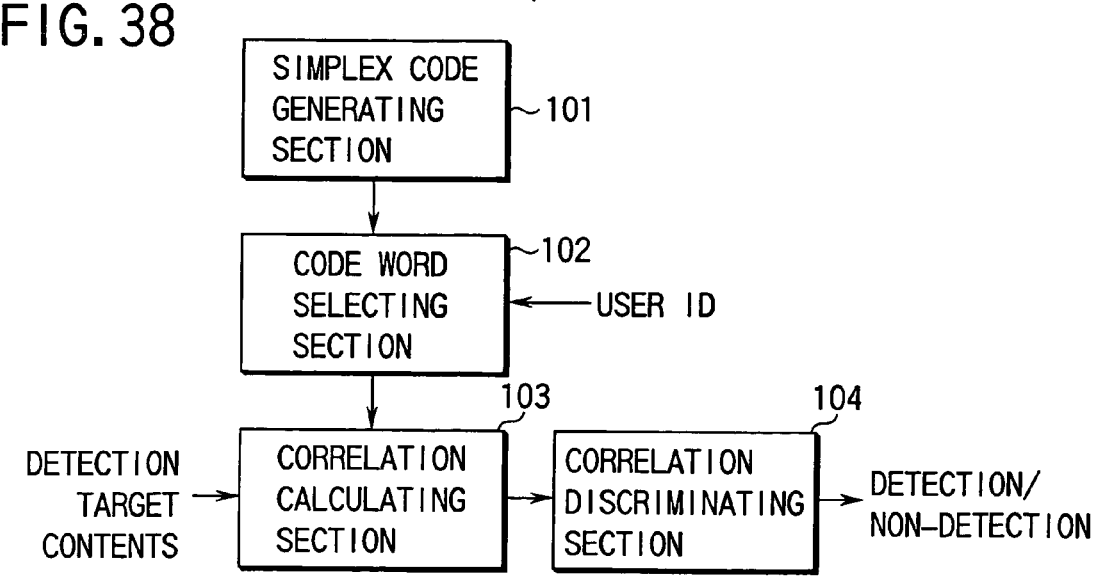
FIG. 39 is a block diagram showing the structure of the watermark detecting unit according to the fifth embodiment.

FIG. 39 shows the structure of the watermark embedding unit according to the present embodiment corresponding to the watermark embedding unit shown in FIG. 37. This watermark embedding unit is comprised of a simplex code generating section 101, a codeword selecting section 102, a correlation calculating section 103, and a correlation discriminating section 104. The simplex code generating section 101 and the codeword selecting section 102 are the same as those of the watermark embedding unit explained with reference to FIG. 37. Therefore, explanation thereof will be omitted.

The correlation calculating section 103 calculates a correlation value with respect to a codeword selected by the code selecting section 102, based on an inputted code-embedded content and an inputted user ID. The correlation discriminating section 104 determines whether or not a codeword from the code selecting section 102 is embedded in the code-embedded content, depending on whether or not the correlation value calculated by the correlation calculating section 103 exceeds a certain threshold value. The section 104 outputs a detection/non-detection signal.

Thus, in the watermark embedding/detecting unit according to the present embodiment, codewords of a simplex code which decreases the cross-correlation value between an arbitrary pair are used as a pseudo random number system and are embedded as watermark information. Therefore, it is possible to extremely reduce the probability of making an erroneous determination that codewords corresponding to a different user ID are embedded as watermark information.

SIXTH EMBODIMENT

Figure 40:
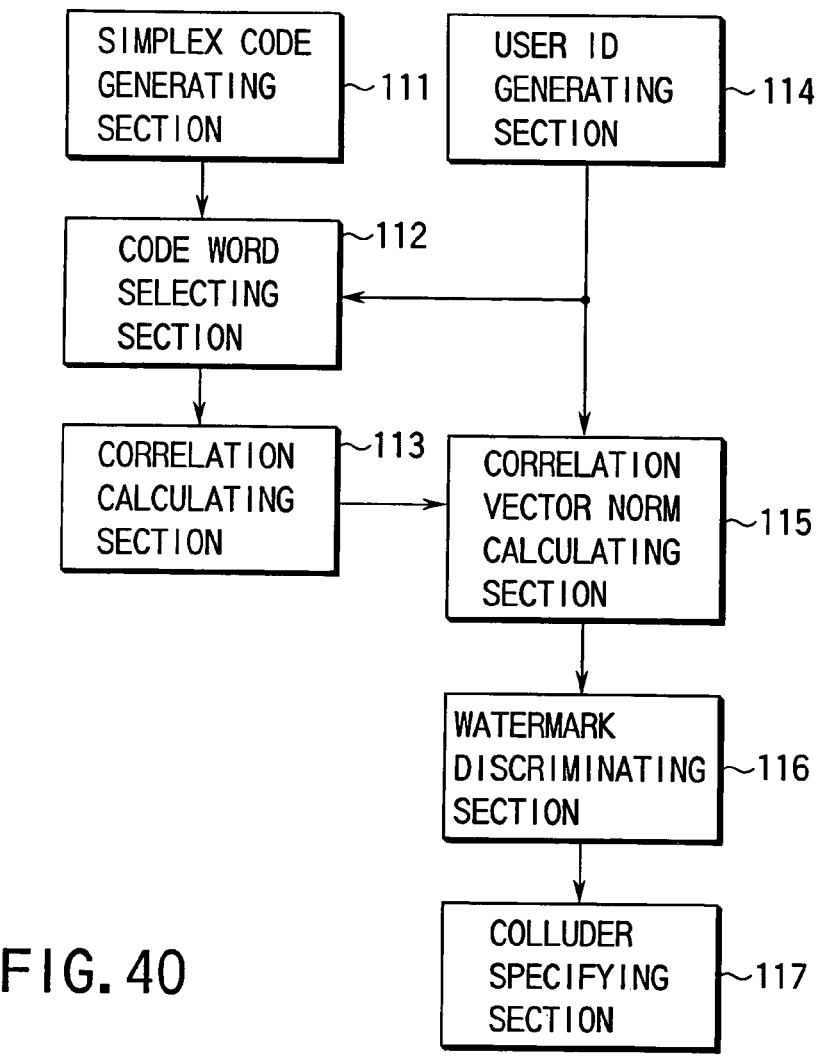
FIG. 40 is a block diagram showing the structure of the watermark detecting unit having the colluder specifying function according to the sixth embodiment of the present invention.
Figure 41:
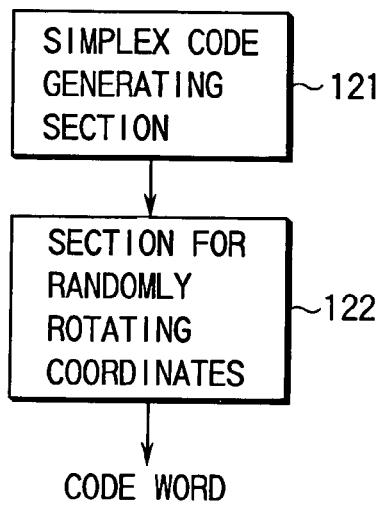
FIG. 41 is a block diagram showing another example of the simplex code generating section in the fifth to sixth embodiments of the present invention.

Next, explanation will be made of a watermark embedding unit as the sixth embodiment of the present invention, which is provided with a colluder specifying function against a collusion attack by applying the watermark embedding unit according to the fifth embodiment. FIG. 40 shows the structure of a part relating to the colluder specifying function according to the present embodiment.

To provide the colluder specifying function, this watermark embedding unit comprises a simplex code generating section 111, a codeword selecting section 112, a correlation calculating section 113, a user ID generating section 114, a correlation vector norm calculating section 115, a watermark discriminating section 116, and a colluder specifying section 117. The simplex code generating section 111, the codeword selecting section 112, and the correlation calculating section 113 are basically the same as those of the watermark embedding unit shown in FIG. 39.

The user ID generating section 114 generates all user IDs that are previously registered. The codeword selecting section 112 selects codewords of simplex codes corresponding to all the user IDs, and correlation values between these codewords and a code-embedded content not shown are calculated by the correlation calculating sections 113.

The correlation vector norm calculating section 115 regards the correlation values calculated with respect to all the user IDs, as vectors, and calculates a norm thereof. The correlation vector norm is a sum of all the correlation values.

The watermark discriminating section 116 determines whether or not watermark information has been embedded, for example, depending on whether or not the norm exceeds a certain threshold value. If it is determined that watermark information has been embedded as a result of this determination, the colluder discriminating section 117 specifies the user who has a user ID which shows the greatest value among the correlation vectors, as a colluder.

In addition to a method of this kind, the colluder specifying section 117 can obtain which component unit among component units of the (n−1)-dimensional unit has the barycenter through which a correlation vector passes. A plurality of colluders can be specified by determining users having user IDs corresponding to the vertexes of the component unit, as colluders.

In the fifth to sixth embodiments, a simplex code generated by the simplex code generating section 121 may be rotated randomly by means of a section for randomly rotating coordinates 122, thereby to attain codewords, if Gaussian noise of N(0,1) is adopted as the pseudo random number system used as watermark information.

Further, the code generating unit according to the present invention can be applied not only to generate a code to be embedded as watermark in an embedding target content as digital data, like a watermark embedding unit, but also to generate a code to be chemically embedded in a synthetic material made of chemical material, for example. For example, with respect to a plurality of portions in which the structure of the material may be changed from a view point of an actual use, the bits of the codeword according to the present invention may correspond to such that changing of the structure is set to "1" and no changing of the structure is set to "0."

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A watermark embedding unit for embedding watermark information containing information of a user identification number into a predetermined content to prevent collusion attack, comprising:

means for outputting at least one simplex codeword selected from a plurality of simplex codewords constructing a simplex code, in correspondence with an inputted user identification number, wherein, when a number of the plurality of simplex codewords is N and a codelength of the simplex codewords is N−1, a correlation value between simplex codewords is $-1/(N-1)$; and means for embedding the outputted at least one simplex codeword as watermark information into the content as an embedding target.

2. A watermark detecting unit for detecting watermark information containing information of a user identification number from a predetermined content, comprising:

means for generating a plurality of codewords based on an N-dimensional Hadamard matrix by using a simplex code, wherein, when a codelength of the codewords is N−1 and a number of the codewords is N, a correlation value between codewords is $-1/(N-1)$;

means for outputting a codeword selected from the plurality of codewords constructing the simplex code, in correspondence with an inputted user identification number;

means for obtaining a correlation value between the outputted codeword and the content;

means for identifying, as a colluder, an identification number corresponding to a codeword having a largest correlation value obtained by the means for obtaining a correlation value; and means for determining presence or absence of a codeword corresponding to the inputted user identification number in the content, based on the correlation value.

3. A watermark detecting unit for detecting watermark information containing information of a user identification number from a predetermined content, comprising:

means for outputting a plurality of codewords which respectively correspond to a plurality of previously registered user identification numbers and which construct a simplex code;

means for obtaining a correlation value between each of the outputted codewords and the content;

means for identifying, as a colluder, an identification number corresponding to a codeword having a largest correlation value obtained by the means for obtaining a correlation value; and means for determining presence or absence of watermark information, based on a norm calculated, regarding each obtained correlation value as a vector, and for specifying a the colluder based on the correlation value if the presence of watermark information is determined.

* * * * *